(12) United States Patent
Huang

(10) Patent No.: US 7,980,961 B2
(45) Date of Patent: *Jul. 19, 2011

(54) PANEL GRIP WITH MODIFIED SEAM

(76) Inventor: Ben Huang, Huntington Beach, CA (US)

( * ) Notice: Subject to any disclaimer, the term of this patent is extended or adjusted under 35 U.S.C. 154(b) by 552 days.

This patent is subject to a terminal disclaimer.

(21) Appl. No.: 11/682,264

(22) Filed: Mar. 5, 2007

(65) Prior Publication Data

US 2007/0149307 A1 Jun. 28, 2007

Related U.S. Application Data

(63) Continuation of application No. 11/172,770, filed on Jul. 1, 2005, now Pat. No. 7,186,189.

(51) Int. Cl.
A63B 53/14 (2006.01)

(52) U.S. Cl. ..................................................... 473/300

(58) Field of Classification Search ........... 473/300–303
See application file for complete search history.

(56) References Cited

U.S. PATENT DOCUMENTS

| | | | |
|---|---|---|---|
| 571,025 A | 11/1896 | Spamer |
| 834,711 A | 10/1906 | Clarke et al. |
| 979,266 A | 12/1910 | Dean |
| 1,008,604 A | 11/1911 | Lake |
| 1,017,565 A | 2/1912 | Lard |
| 1,139,843 A | 5/1915 | Brown |
| 1,345,505 A | 7/1920 | Persons |
| 1,435,088 A | 11/1922 | Smith |
| 1,522,635 A | 1/1924 | Kraeuter |
| 1,528,190 A | 3/1925 | Howe |
| 1,617,972 A | 2/1927 | Wallace |
| 1,890,037 A | 11/1930 | Johnson |
| 1,943,399 A | 1/1934 | Smith |
| 2,000,295 A | 5/1935 | Oldham |
| 2,086,062 A | 7/1937 | Bray |
| 2,103,889 A | 12/1937 | Brisick |
| 2,149,911 A | 3/1939 | East |
| 2,206,056 A | 7/1940 | Sheesley |
| 2,221,421 A | 11/1940 | Curry |
| 2,225,839 A | 12/1940 | Moore |
| 2,449,575 A | 9/1948 | Wilhelm |

(Continued)

FOREIGN PATENT DOCUMENTS

CN 2139008 Y 7/1993

(Continued)

OTHER PUBLICATIONS

European Search Report, European Application No. EP 04 25 7967, 4 pages—cites: US 2004/185958; EP 1 371 397; US 2,225,839; US 6,666,777; US 5,839,983; US 5,577,722; and US 979,266.

(Continued)

*Primary Examiner* — Stephen L. Blau

(74) *Attorney, Agent, or Firm* — Knobbe Martens Olson & Bear LLP

(57) ABSTRACT

A grip for the handle of a golf club having at least one panel with a modified seam that is wrapped about an underlisting sleeve. The edges of the panels are coupled together with three attachment interfaces. The grip reduces impact shock and provides a feeling of tackiness in the manner of a spirally wrapped polyurethane-felt grip while allowing the use of multiple color panels and inserts and easy installation onto a golf club shaft.

9 Claims, 21 Drawing Sheets

U.S. PATENT DOCUMENTS

| | | | |
|---|---|---|---|
| 2,523,637 A | 9/1950 | Stanfield et al. |
| 2,671,660 A | 3/1954 | Goodwin |
| 2,690,338 A | 9/1954 | Brocke |
| 2,772,090 A | 11/1956 | Brandon |
| 2,934,285 A | 4/1960 | Niehaus |
| 2,984,486 A | 5/1961 | Jones |
| 3,028,283 A | 4/1962 | Lundgren et al. |
| 3,059,816 A | 10/1962 | Goldstein |
| 3,073,055 A | 1/1963 | Edwards et al. |
| 3,087,729 A | 4/1963 | Sullivan |
| 3,095,198 A | 6/1963 | Gasche |
| 3,140,873 A | 7/1964 | Goodwin |
| 3,157,723 A | 11/1964 | Hochberg |
| 3,311,375 A | 3/1967 | Onions |
| 3,366,384 A | 1/1968 | Lamkin et al. |
| 3,368,811 A | 2/1968 | Finney |
| 3,503,784 A | 3/1970 | Morita et al. |
| 3,606,325 A | 9/1971 | Lamkin et al. |
| 3,697,315 A | 10/1972 | Mine |
| 3,857,745 A | 12/1974 | Grausch et al. |
| 3,876,320 A | 4/1975 | Phillipson |
| 3,922,402 A | 11/1975 | Shimamura et al. |
| 3,973,348 A | 8/1976 | Shell |
| 3,992,021 A | 11/1976 | Tobin |
| 4,012,039 A | 3/1977 | Yerke |
| 4,015,851 A | 4/1977 | Pennell |
| 4,052,061 A | 10/1977 | Stewart |
| 4,133,529 A | 1/1979 | Gambino |
| 4,137,360 A | 1/1979 | Reischl |
| 4,216,251 A | 8/1980 | Nishimura et al. |
| 4,284,275 A | 8/1981 | Fletcher |
| 4,347,280 A | 8/1982 | Lau et al. |
| 4,358,499 A | 11/1982 | Hill |
| 4,373,718 A | 2/1983 | Schmidt |
| 4,448,922 A | 5/1984 | McCartney |
| 4,535,649 A | 8/1985 | Stahel |
| 4,613,537 A | 9/1986 | Krüpper |
| 4,651,991 A | 3/1987 | McDuff |
| 4,662,415 A | 5/1987 | Proutt |
| 4,765,856 A | 8/1988 | Doubt |
| 4,878,667 A | 11/1989 | Tosti |
| 4,919,420 A | 4/1990 | Sato |
| 4,941,232 A | 7/1990 | Decker et al. |
| 4,971,837 A | 11/1990 | Martz et al. |
| 5,024,866 A | 6/1991 | Goode |
| 5,055,340 A | 10/1991 | Matsumura et al. |
| 5,118,107 A | 6/1992 | Bucher |
| 5,123,646 A | 6/1992 | Overby et al. |
| 5,127,650 A | 7/1992 | Schneller |
| 5,261,665 A | 11/1993 | Downey |
| 5,322,290 A | 6/1994 | Minami |
| 5,343,776 A | 9/1994 | Falco |
| 5,374,059 A | 12/1994 | Huang |
| 5,396,727 A | 3/1995 | Furuya et al. |
| 5,427,376 A | 6/1995 | Cummings et al. |
| 5,469,601 A | 11/1995 | Jackson |
| 5,474,802 A | 12/1995 | Shimoda et al. |
| 5,480,146 A | 1/1996 | Comer |
| 5,485,996 A | 1/1996 | Niksich |
| 5,511,445 A | 4/1996 | Hildebrandt |
| 5,537,773 A | 7/1996 | Matsubara et al. |
| 5,570,884 A | 11/1996 | Carps |
| 5,571,050 A | 11/1996 | Huang |
| 5,577,722 A | 11/1996 | Glassberg |
| 5,584,482 A | 12/1996 | Huang |
| 5,595,544 A | 1/1997 | Roelke |
| 5,611,533 A | 3/1997 | Williams |
| 5,624,116 A | 4/1997 | Yeh |
| 5,626,527 A | 5/1997 | Eberlein |
| 5,634,859 A | 6/1997 | Nesbitt |
| 5,645,501 A | 7/1997 | Huang |
| 5,671,923 A | 9/1997 | Huang |
| 5,690,566 A | 11/1997 | Bracho |
| 5,695,418 A | 12/1997 | Huang |
| 5,730,662 A | 3/1998 | Rens |
| 5,730,669 A | 3/1998 | Huang |
| 5,753,568 A | 5/1998 | Shimano et al. |
| 5,772,524 A | 6/1998 | Huang |
| 5,781,963 A | 7/1998 | Maru et al. |
| 5,797,813 A | 8/1998 | Huang |
| 5,803,828 A | 9/1998 | Huang |
| 5,813,921 A | 9/1998 | Huang |
| 5,816,933 A | 10/1998 | Huang |
| 5,816,934 A | 10/1998 | Huang |
| 5,827,129 A | 10/1998 | Huang |
| 5,839,983 A | 11/1998 | Kramer |
| 5,851,632 A | 12/1998 | Chen et al. |
| 5,857,929 A | 1/1999 | Huang |
| 5,867,868 A | 2/1999 | Ward |
| 5,890,260 A | 4/1999 | Gaunt |
| 5,890,972 A | 4/1999 | Huang |
| 5,895,329 A | 4/1999 | Huang |
| 5,910,054 A | 6/1999 | Huang |
| 5,924,941 A | 7/1999 | Hagey |
| 5,997,421 A | 12/1999 | Huang |
| 6,036,607 A | 3/2000 | Finegan |
| 6,048,275 A | 4/2000 | Gedeon |
| 6,197,392 B1 | 3/2001 | Jones |
| 6,226,836 B1 | 5/2001 | Yasui |
| 6,244,975 B1 | 6/2001 | Huang |
| 6,261,191 B1 | 7/2001 | Chen |
| 6,314,617 B1 | 11/2001 | Hastings |
| 6,360,475 B1 | 3/2002 | Lepage et al. |
| 6,361,450 B1 | 3/2002 | Huang |
| 6,386,989 B1 | 5/2002 | Huang |
| D463,520 S | 9/2002 | Ulrich |
| 6,449,803 B1 | 9/2002 | McConchie |
| 6,503,153 B2 | 1/2003 | Wang |
| 6,506,128 B1 | 1/2003 | Bloom, Jr. |
| 6,511,732 B1 | 1/2003 | Chao |
| 6,551,198 B2 | 4/2003 | Huang |
| 6,558,270 B2 | 5/2003 | Kwitek |
| 6,627,027 B2 | 9/2003 | Huang |
| 6,629,901 B2 | 10/2003 | Huang |
| 6,635,688 B2 | 10/2003 | Simpson |
| 6,652,398 B2 | 11/2003 | Falone et al. |
| 6,656,054 B2 | 12/2003 | Ulrich |
| 6,656,057 B2 | 12/2003 | Lamkin et al. |
| 6,663,500 B2 | 12/2003 | Huang |
| 6,666,777 B1 | 12/2003 | Lamkin et al. |
| 6,676,534 B2 | 1/2004 | Huang |
| 6,695,713 B2 | 2/2004 | Huang |
| 6,709,346 B1 | 3/2004 | Wang |
| 6,733,401 B1 | 5/2004 | Huang |
| 6,762,243 B2 | 7/2004 | Stender et al. |
| 6,827,656 B1 | 12/2004 | Hoeflich et al. |
| 6,843,732 B1 * | 1/2005 | Huang .................. 473/300 |
| 6,857,971 B2 | 2/2005 | Huang |
| 6,908,400 B2 | 6/2005 | Chu et al. |
| 6,973,750 B1 | 12/2005 | Kim |
| 6,974,626 B2 * | 12/2005 | Horacek .................. 428/354 |
| 7,008,582 B2 | 3/2006 | Chen |
| 7,048,644 B2 | 5/2006 | Wang |
| 7,137,904 B2 | 11/2006 | Huang |
| 7,140,973 B2 | 11/2006 | Rohrer |
| D534,602 S | 1/2007 | Norton et al. |
| D534,603 S | 1/2007 | Norton et al. |
| D534,604 S | 1/2007 | Norton et al. |
| D534,605 S | 1/2007 | Norton et al. |
| D534,607 S | 1/2007 | Norton et al. |
| D534,975 S | 1/2007 | Norton et al. |
| D536,048 S | 1/2007 | Chen |
| D538,868 S | 3/2007 | Norton et al. |
| D538,869 S | 3/2007 | Wang et al. |
| 7,186,189 B2 * | 3/2007 | Huang .................. 473/300 |
| 7,195,568 B2 | 3/2007 | Huang |
| 7,219,395 B2 | 5/2007 | Bigolin |
| 7,344,447 B2 | 3/2008 | Chang |
| 7,344,448 B2 | 3/2008 | Huang |
| 7,347,792 B2 | 3/2008 | Huang |
| 7,374,498 B2 | 5/2008 | Huang |
| 7,404,770 B2 | 7/2008 | Huang |
| 7,438,646 B2 | 10/2008 | Huang |
| 7,448,957 B2 * | 11/2008 | Huang .................. 473/300 |
| 7,448,958 B2 * | 11/2008 | Huang .................. 473/300 |
| 7,458,903 B2 | 12/2008 | Wang et al. |
| 7,470,199 B2 | 12/2008 | Huang |

| | | | |
|---|---|---|---|
| 7,491,133 | B2 | 2/2009 | Huang |
| 7,527,564 | B2 | 5/2009 | Huang |
| 7,566,375 | B2 * | 7/2009 | Huang ............................ 156/63 |
| 7,585,230 | B2 | 9/2009 | Huang |
| 7,770,321 | B2 | 8/2010 | Huang |
| 2002/0028325 | A1 | 3/2002 | Simpson |
| 2002/0142858 | A1 | 10/2002 | Chen |
| 2002/0142900 | A1 | 10/2002 | Wang |
| 2002/0151373 | A1 | 10/2002 | Beauregard |
| 2002/0173371 | A1 | 11/2002 | Lamkin et al. |
| 2003/0040384 | A1 | 2/2003 | Falone et al. |
| 2003/0045370 | A1 | 3/2003 | Jaw |
| 2003/0062654 | A1 | 4/2003 | Lamkin |
| 2003/0139223 | A1 | 7/2003 | Ulrich et al. |
| 2003/0148836 | A1 | 8/2003 | Falone et al. |
| 2003/0150081 | A1 | 8/2003 | Wang |
| 2003/0216192 | A1 * | 11/2003 | Chu ............................ 473/300 |
| 2003/0228930 | A1 | 12/2003 | Huang |
| 2004/0029645 | A1 | 2/2004 | Chen |
| 2004/0029646 | A1 | 2/2004 | Chu et al. |
| 2004/0031128 | A1 | 2/2004 | Chen |
| 2004/0109980 | A1 | 6/2004 | Chen et al. |
| 2004/0123429 | A1 | 7/2004 | Wang |
| 2004/0185958 | A1 | 9/2004 | Huang |
| 2004/0266546 | A1 | 12/2004 | Huang |
| 2005/0123723 | A1 | 6/2005 | Wang |
| 2005/0148401 | A1 | 7/2005 | Huang |
| 2005/0229285 | A1 | 10/2005 | Chung |
| 2005/0276925 | A1 | 12/2005 | Su |
| 2005/0287329 | A1 * | 12/2005 | Lai .............................. 428/40.1 |
| 2006/0172815 | A1 | 8/2006 | Chu |
| 2006/0252571 | A1 * | 11/2006 | Wang ............................ 473/300 |
| 2006/0264268 | A1 | 11/2006 | Huang |
| 2006/0287123 | A1 * | 12/2006 | Wang ............................ 473/300 |
| 2008/0120893 | A1 | 5/2008 | Keys et al. |
| 2008/0229646 | A1 | 9/2008 | Huang |
| 2008/0230174 | A1 | 9/2008 | Huang |
| 2008/0283178 | A1 | 11/2008 | Huang |
| 2009/0025852 | A1 | 1/2009 | Huang |
| 2009/0048036 | A1 | 2/2009 | Huang |
| 2009/0258721 | A1 | 10/2009 | Huang |
| 2009/0258722 | A1 | 10/2009 | Huang |
| 2010/0022322 | A1 | 1/2010 | Huang |

FOREIGN PATENT DOCUMENTS

| | | | |
|---|---|---|---|
| CN | 2163667 Y | | 5/1994 |
| CN | 2288744 | | 8/1998 |
| CN | 1332022 A | | 7/2000 |
| CN | 2438768 | | 7/2001 |
| CN | 2444645 | | 8/2001 |
| CN | 02254450.X | | 9/2002 |
| CN | 2596752 | | 1/2004 |
| CN | 2659497 | | 12/2004 |
| DE | 36 44 674 A1 | | 7/1988 |
| DE | 92 18 550 U1 | | 8/1994 |
| EP | 1 371 397 | | 12/2003 |
| FR | 2 731 402 A3 | | 9/1996 |
| GB | 2 192 550 A | | 1/1988 |
| JP | 55-43008 | | 3/1980 |
| JP | 7-41731 | | 2/1995 |
| JP | 3081404 | | 8/2001 |
| JP | 2002-028264 | | 1/2002 |
| JP | 2002028264 A | * | 1/2002 |
| WO | WO 2005/115563 A1 | | 12/2005 |

OTHER PUBLICATIONS

Partial European Search Report, App. No. EP 03 25 5917, 2 pages—cites: 5,671,923; 4,765,856; US 2002/173371; US 2003/040384; and 5,571,050.
U.S. Appl. No. 10/167,216, filed Jun. 11, 2002, pending.
U.S. Appl. No. 10/348,389, filed Jan. 21, 2003, now U.S. Patent No. 6,733,401, issued May 11, 2004.
U.S. Appl. No. 10/392,480, filed Mar. 18, 2003, now U.S. Patent No. 6,857,971, issued Feb. 22, 2005.
U.S. Appl. No. 10/746,764, filed Dec. 23, 2003 now U.S. Patent No. 6,843,732, issued Jan. 18, 2005.
U.S. Appl. No. 10/608,598, filed Jun. 27, 2003, pending.
U.S. Appl. No. 10/785,379, filed Feb. 24, 2004, pending.
U.S. Appl. No. 10/827,095, filed Apr. 19, 2004, now U.S. Patent No. 7,195,568, issued Mar. 27, 2007.
U.S. Appl. No. 10/875,035, filed Jun. 23, 2004, pending.
U.S. Appl. No. 11/029,328, filed Jan. 5, 2005, pending.
U.S. Appl. No. 11/062,046, filed Feb. 18, 2005, pending.
U.S. Appl. No. 11/131,832, filed May 18, 2005, pending.
U.S. Appl. No. 11/172,770, filed Jul. 1, 2005, now U.S. Patent No. 7,186,189, issued Mar. 6, 2007.
U.S. Appl. No. 11/412,196, filed Apr. 25, 2006, pending.
U.S. Appl. No. 11/416,364, filed May 1, 2006, pending.
U.S. Appl. No. 11/413,411, filed Apr. 28, 2006, pending.
U.S. Appl. No. 11/438,808, filed May 22, 2006, pending.
U.S. Appl. No. 11/417,643, filed May 3, 2006, pending.
U.S. Appl. No. 11/417,623, filed May 3, 2006, pending.
U.S. Appl. No. 11/417,555, filed May 3, 2006, pending.
U.S. Appl. No. 11/417,401, filed May 3, 2006, pending.
U.S. Appl. No. 11/689,452, filed Mar. 21, 2007, pending.
U.S. Appl. No. 11/417,696, filed Mar. 5, 2006, pending.
The Random House College Dictionary, Revised Edition, 1975, p. 1233, definition of skive.
Application No. 06250104.4, European Search Report dated Oct. 6, 2006.
U.S. Appl. No. 10/167,216, filed Jun. 11, 2002, now U.S. Patent No. 7,137,904, issued Nov. 21, 2006.
U.S. Appl. No. 10/348,389, filed Jan. 21, 2003, now U.S. Patent No. 6,733,401, issued May 11, 2004.
U.S. Appl. No. 10/392,480, filed Mar. 18, 2003, now U.S. Patent No. 6,857,971, issued Feb. 22, 2005.
U.S. Appl. No. 10/746,764, filed Dec. 23, 2003, now U.S. Patent No. 6,843,732, issued Jan. 18, 2005.
U.S. Appl. No. 10/785,379, filed Feb. 24, 2004, now U.S. Patent No. 7,374,498, issued May 20, 2008.
U.S. Appl. No. 10/827,095, filed Apr. 19, 2004, now U.S. Patent No. 7,195,568, issued Mar. 27, 2007.
U.S. Appl. No. 10/875,035, filed Jun. 23, 2004, now U.S. Patent No. 7,585,230, issued Sep. 8, 2009.
U.S. Appl. No. 11/062,046, filed Feb. 18, 2005, now U.S. Patent No. 7,470,199, issued Dec. 30, 2008.
U.S. Appl. No. 11/131,832, filed May 18, 2005, now U.S. Patent No. 7,527,564, issued May 5, 2009.
U.S. Appl. No. 11/172,770, filed Jul. 1, 2005, now U.S. Patent No. 7,186,189, issued Mar. 6, 2007.
U.S. Appl. No. 11/416,364, filed May 1, 2006, now U.S. Patent No. 7,438,646, issued Oct. 21, 2008.
U.S. Application No. 11/413,411, filed Apr. 28, 2006, now U.S. Patent No. 7,344,448, issued Mar. 18, 2008.
U.S. Appl. No. 11/438,808, filed May 22, 2006, now U.S. Patent No. 7,347,792, issued Mar. 25, 2008.
U.S. Appl. No. 11/417,643, filed May 3, 2006, now U.S. Patent No. 7,448,957, issued Nov. 11, 2008.
U.S. Appl. No. 11/417,623, filed May 3, 2006, now U.S. Patent No. 7,566,375, issued Jul. 28, 2009.
U.S. Appl. No. 11/417,555, filed May 3, 2006, now U.S. Patent No. 7,404,770, issued Jul. 29, 2008.
U.S. Appl. No. 11/417,401, filed May 3, 2006, now U.S. Patent No. 7,491,133, issued Feb. 17, 2009.
U.S. Appl. No. 11/417,696, filed Mar. 5, 2006, now U.S. Patent No. 7,448,958, issued Nov. 11, 2008.
U.S. Appl. No. 12/753,804, filed Apr. 2, 2010, pending.
U.S. Appl. No. 12/753,669, filed Apr. 2, 2010, pending.
U.S. Appl. No. 12/753,799, filed Apr. 2, 2010, pending.
U.S. Appl. No. 12/753,773, filed Apr. 2, 2010, pending.
U.S. Appl. No. 12/767,736, filed Apr. 26, 2010, pending.
U.S. Appl. No. 12/848,052, filed Jul. 30, 2010, pending.
U.S. Appl. No. 12/862,673, filed Aug. 24, 2010, pending.
U.S. Appl. No. 12/948,637, filed Nov. 17, 2010, pending.
U.S. Appl. No. 12/960,261, filed Dec. 03, 2010, pending.

* cited by examiner

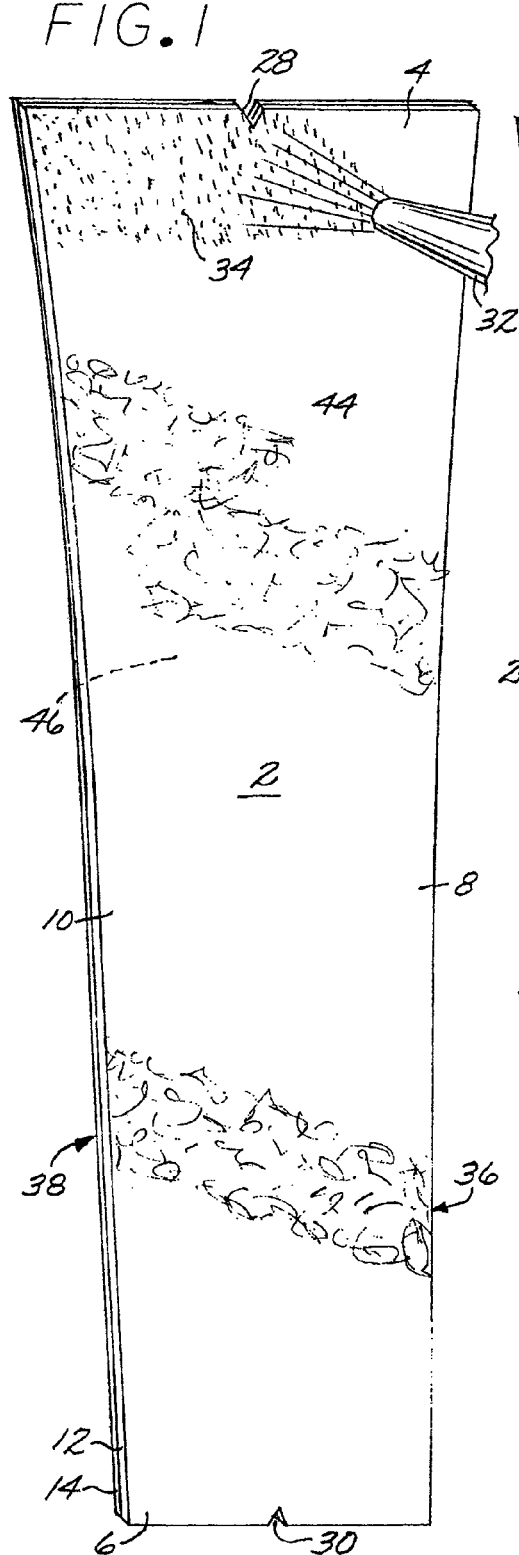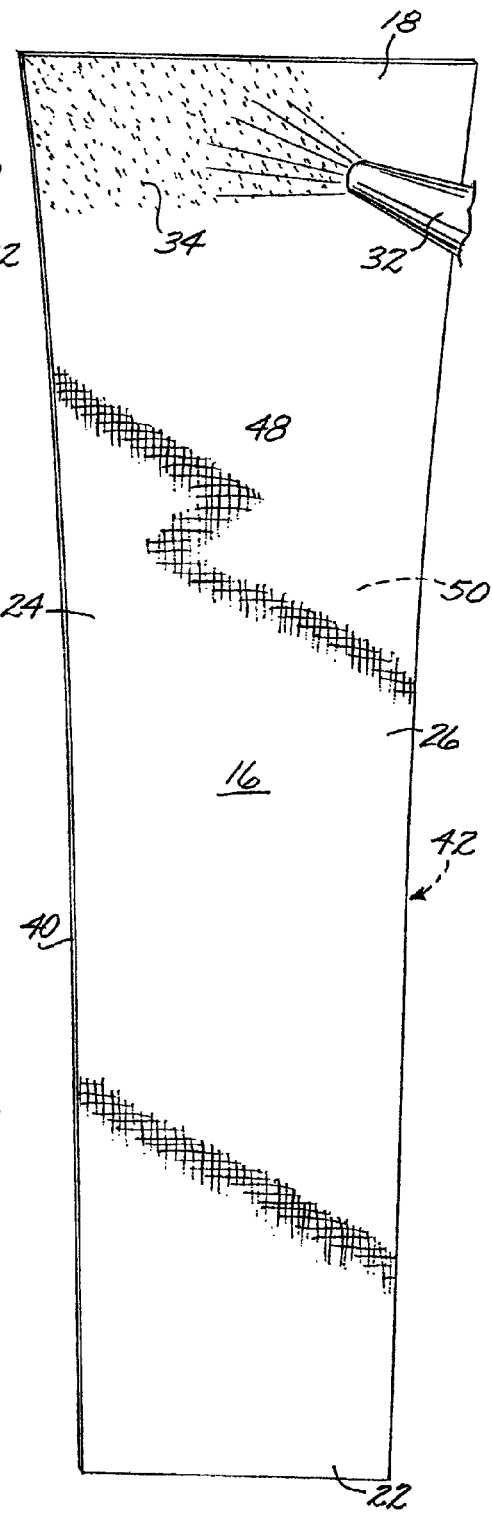

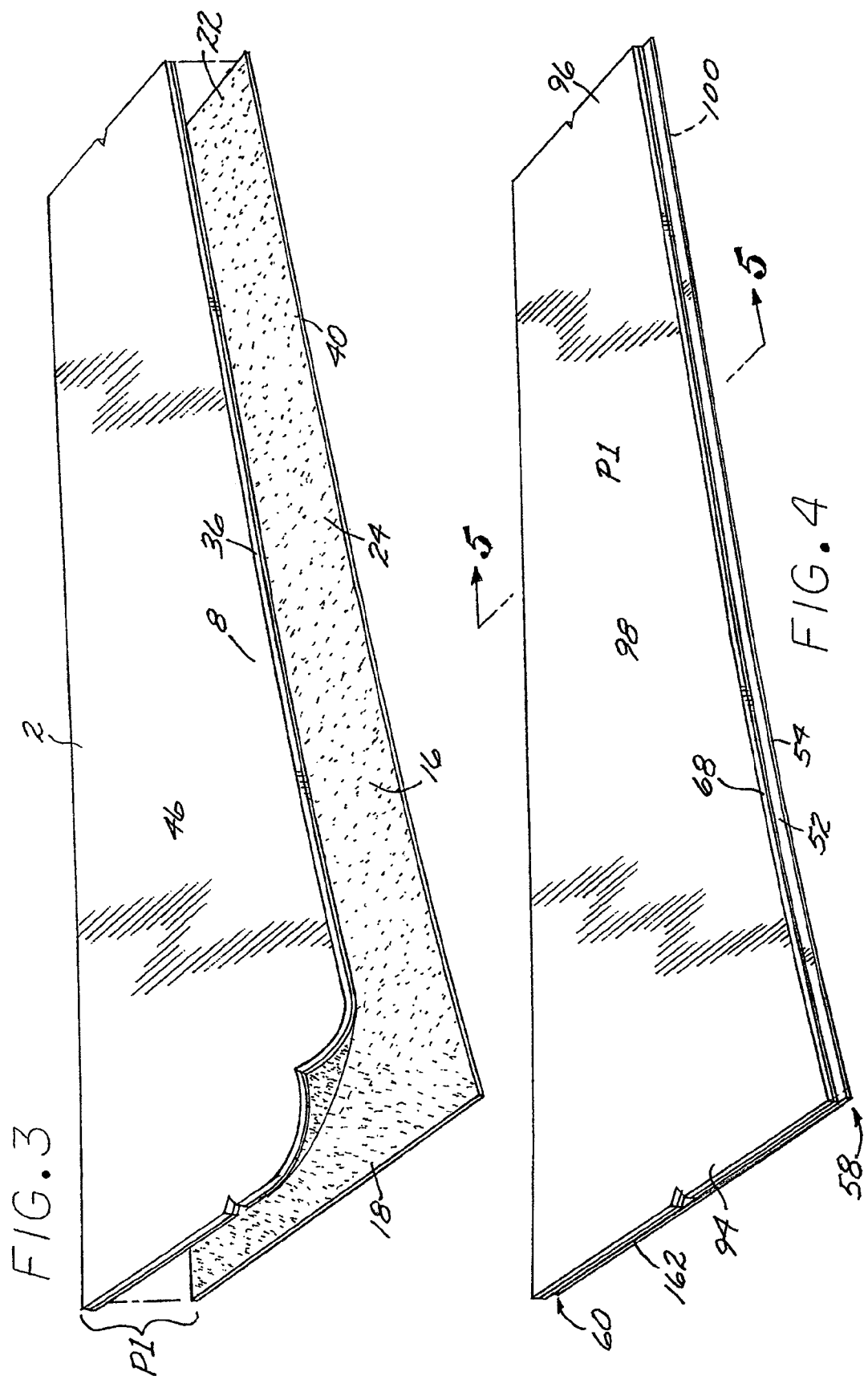

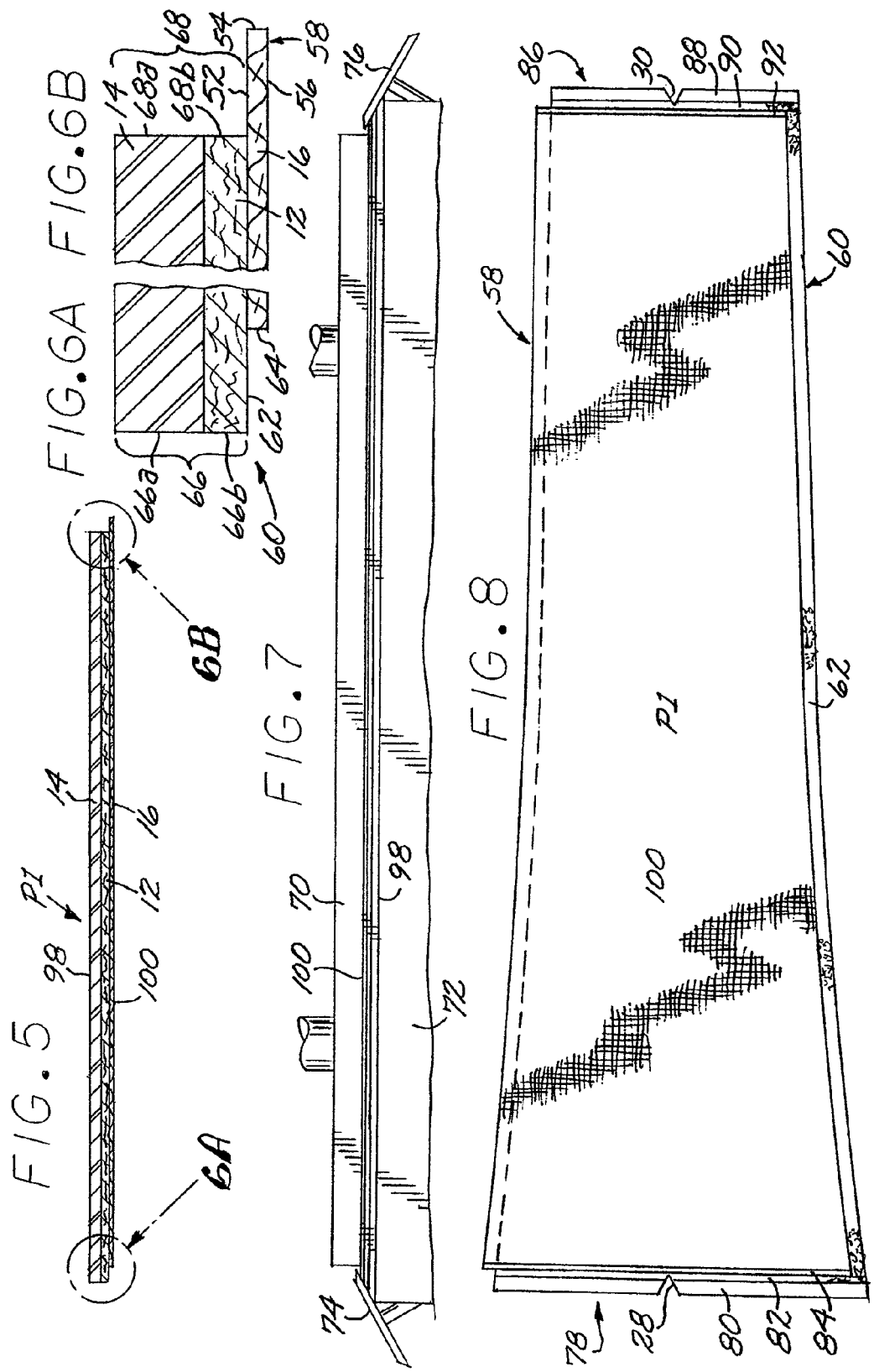

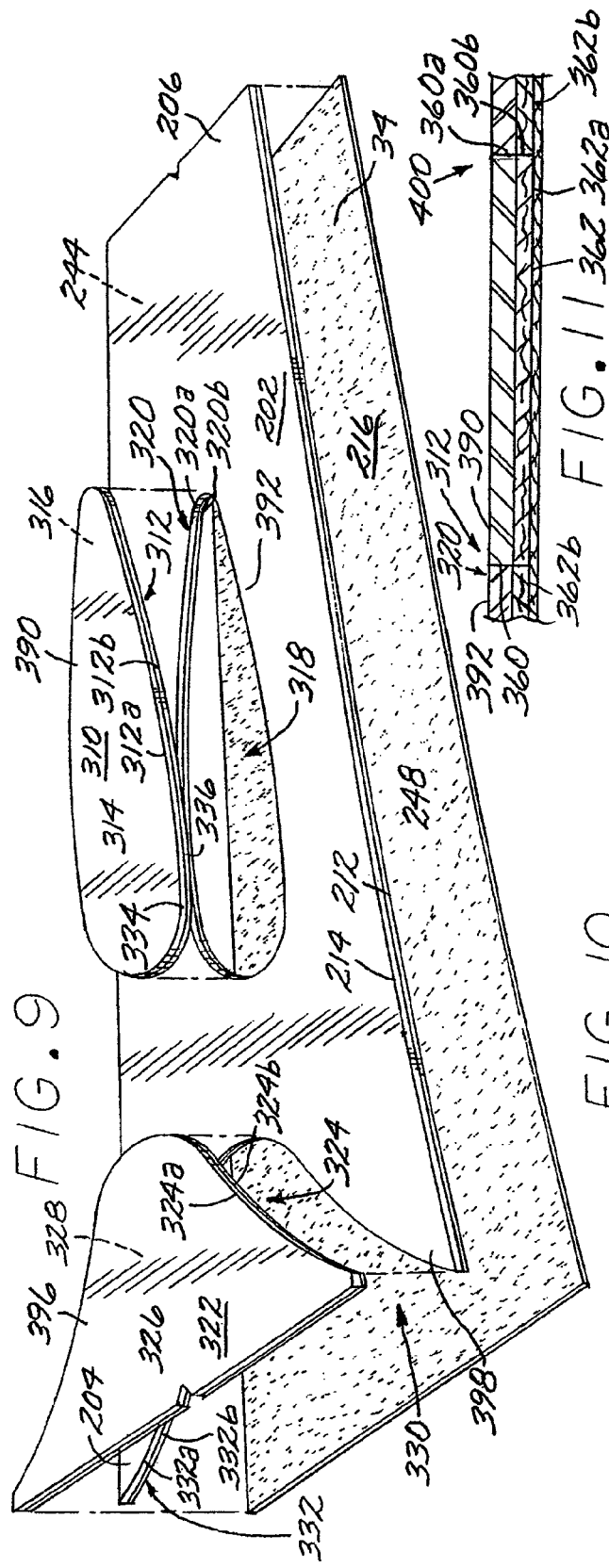
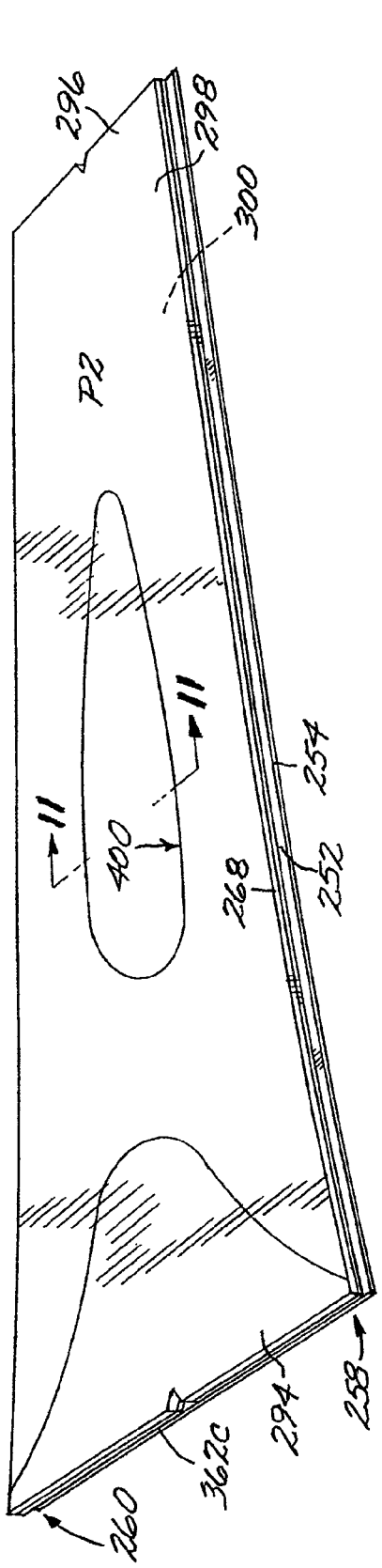
FIG. 9
FIG. 10
FIG. 11

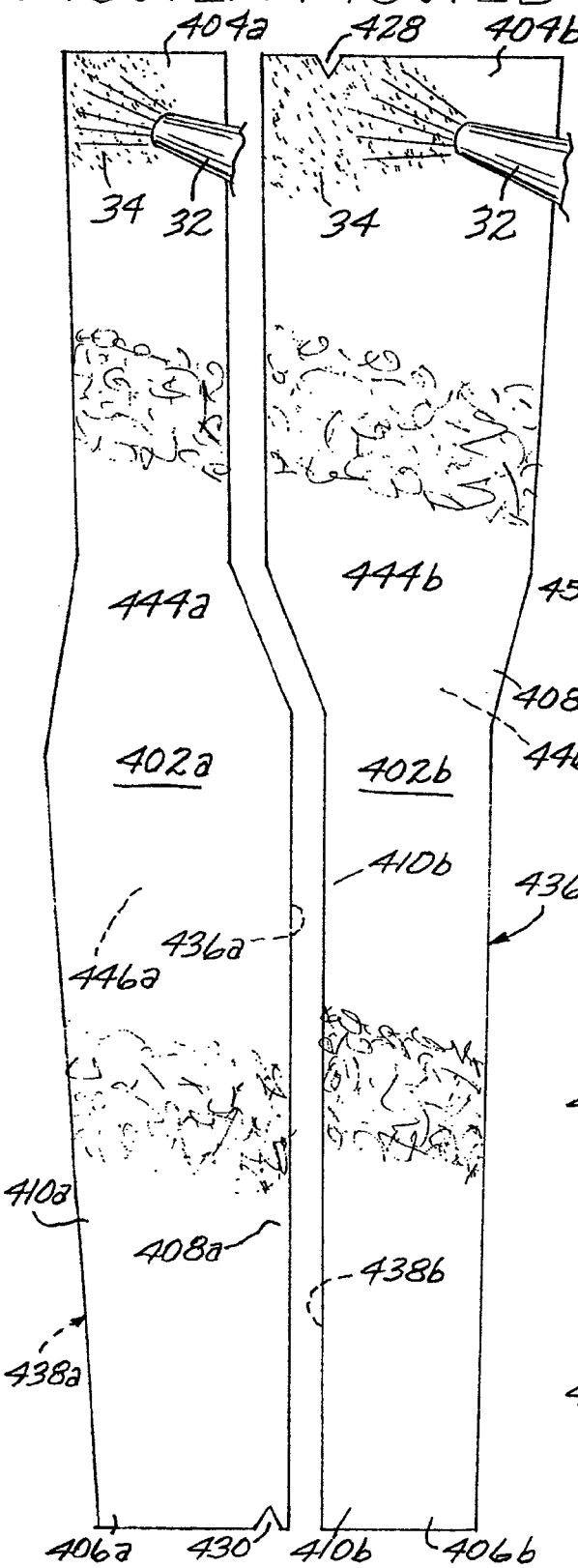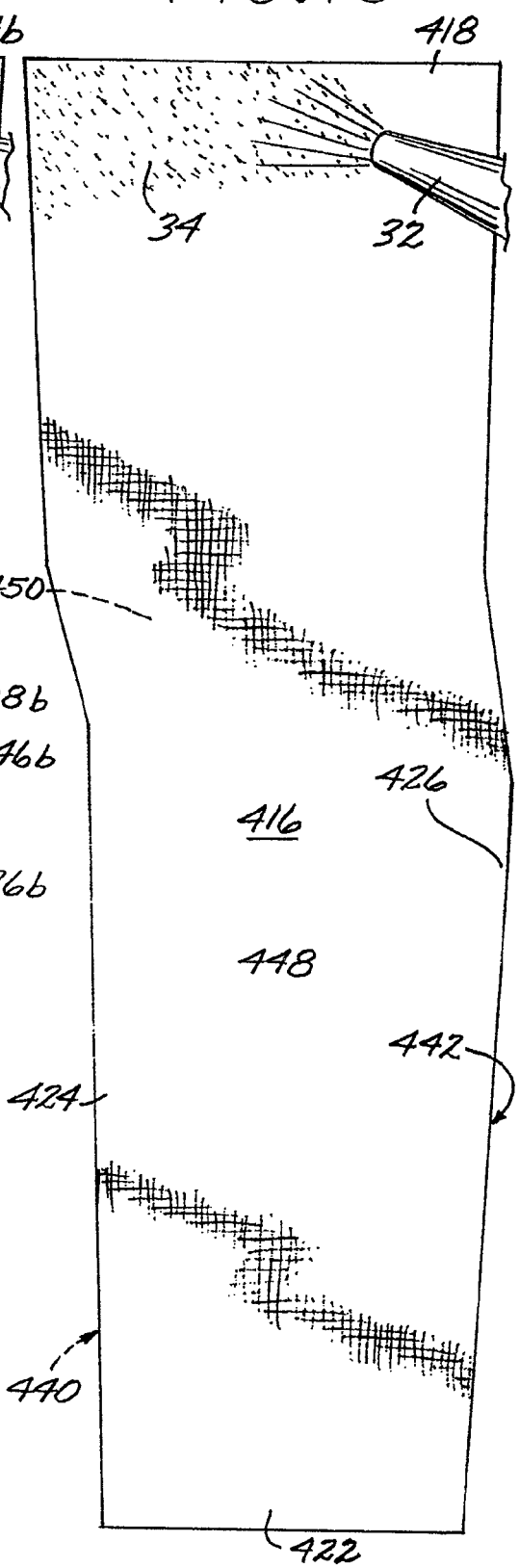

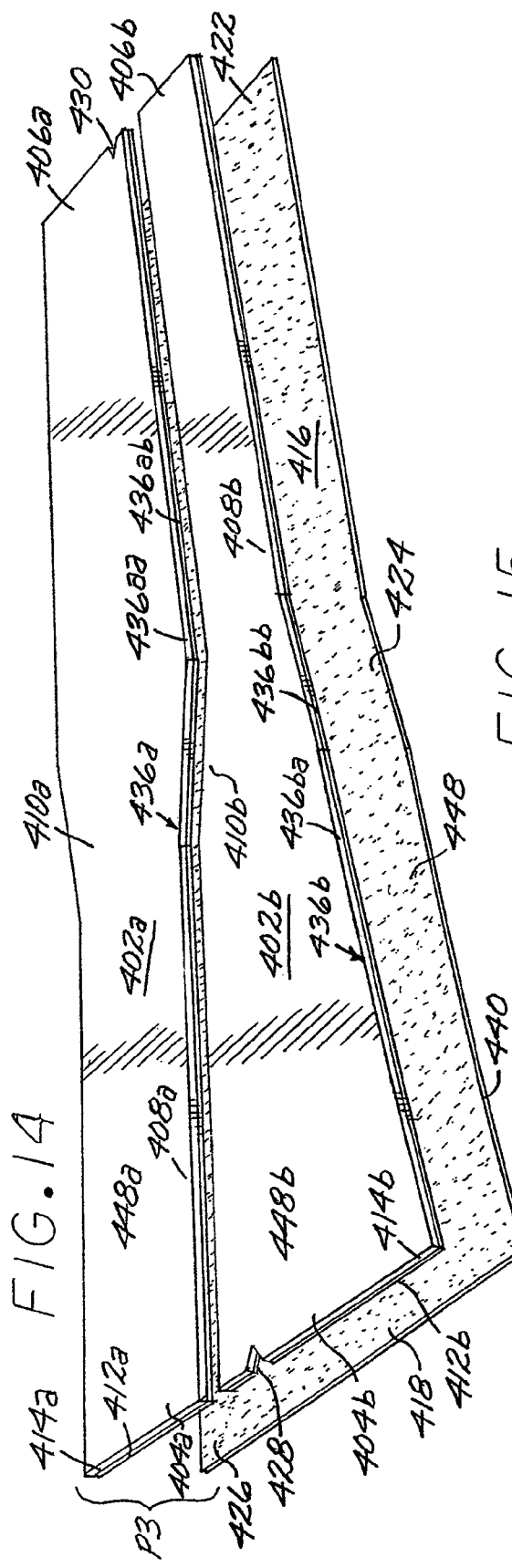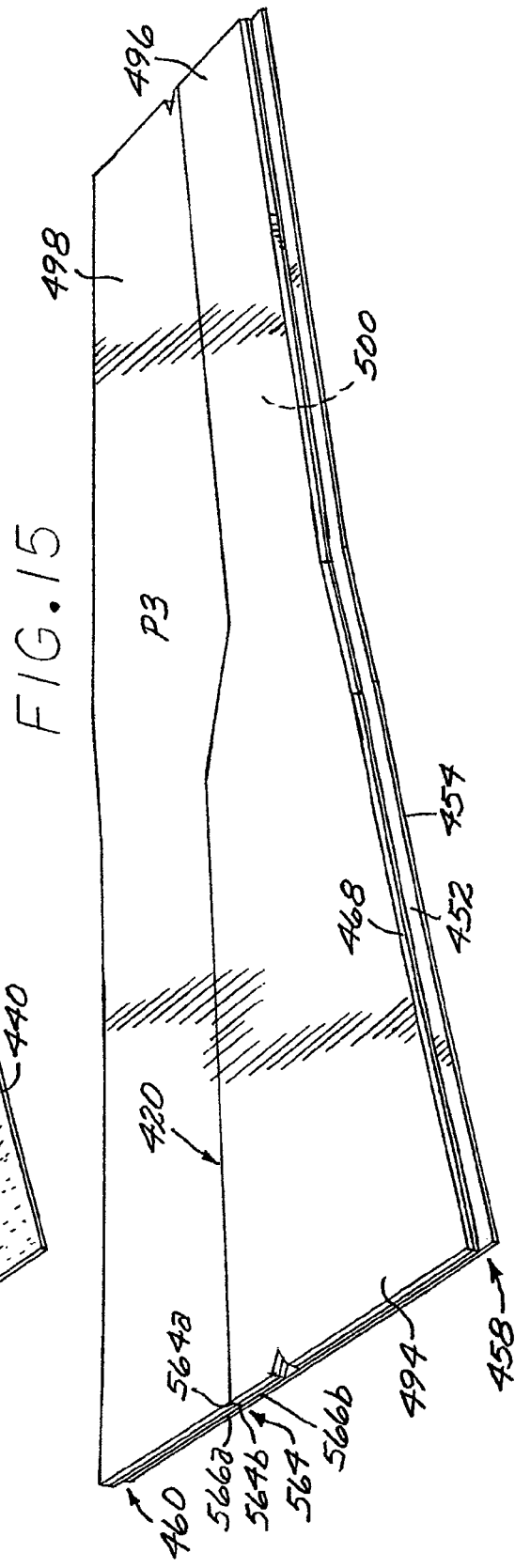

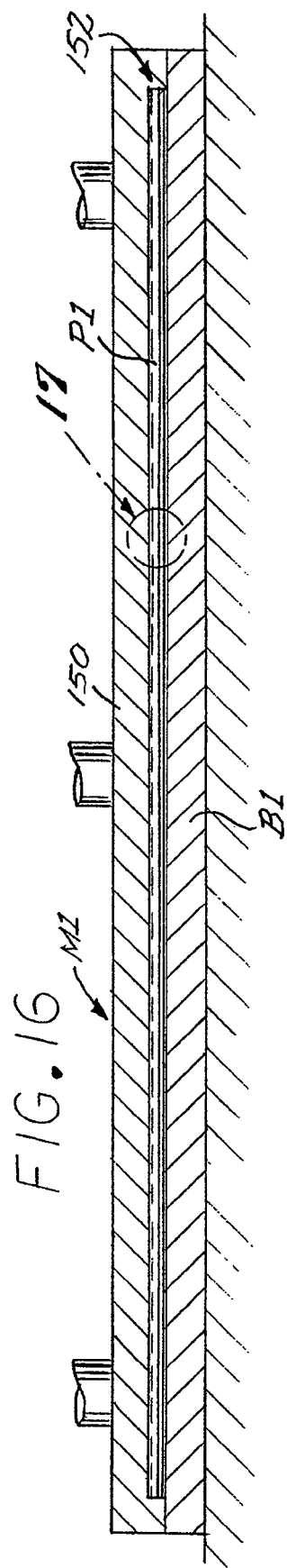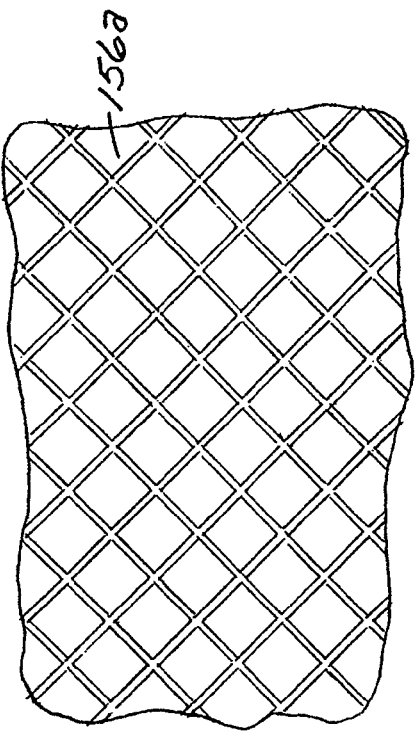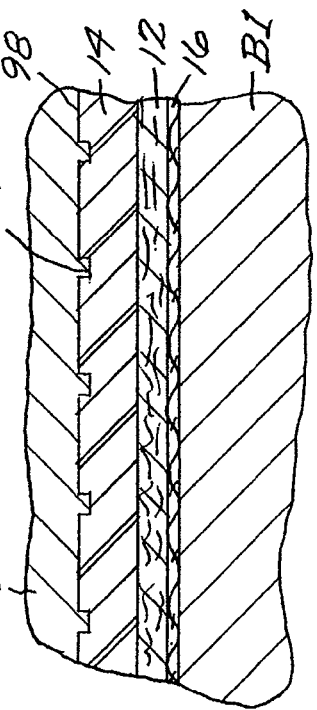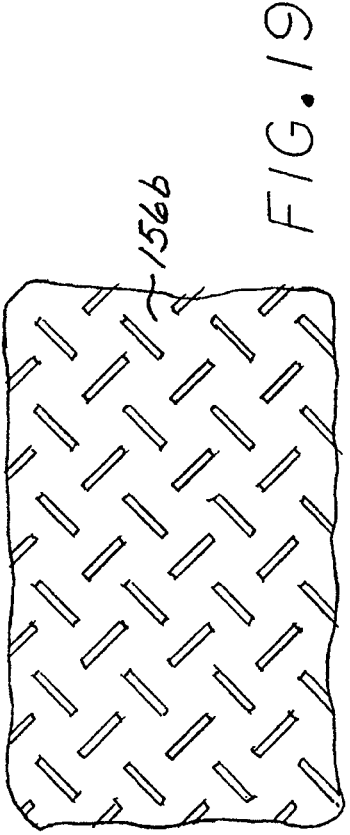

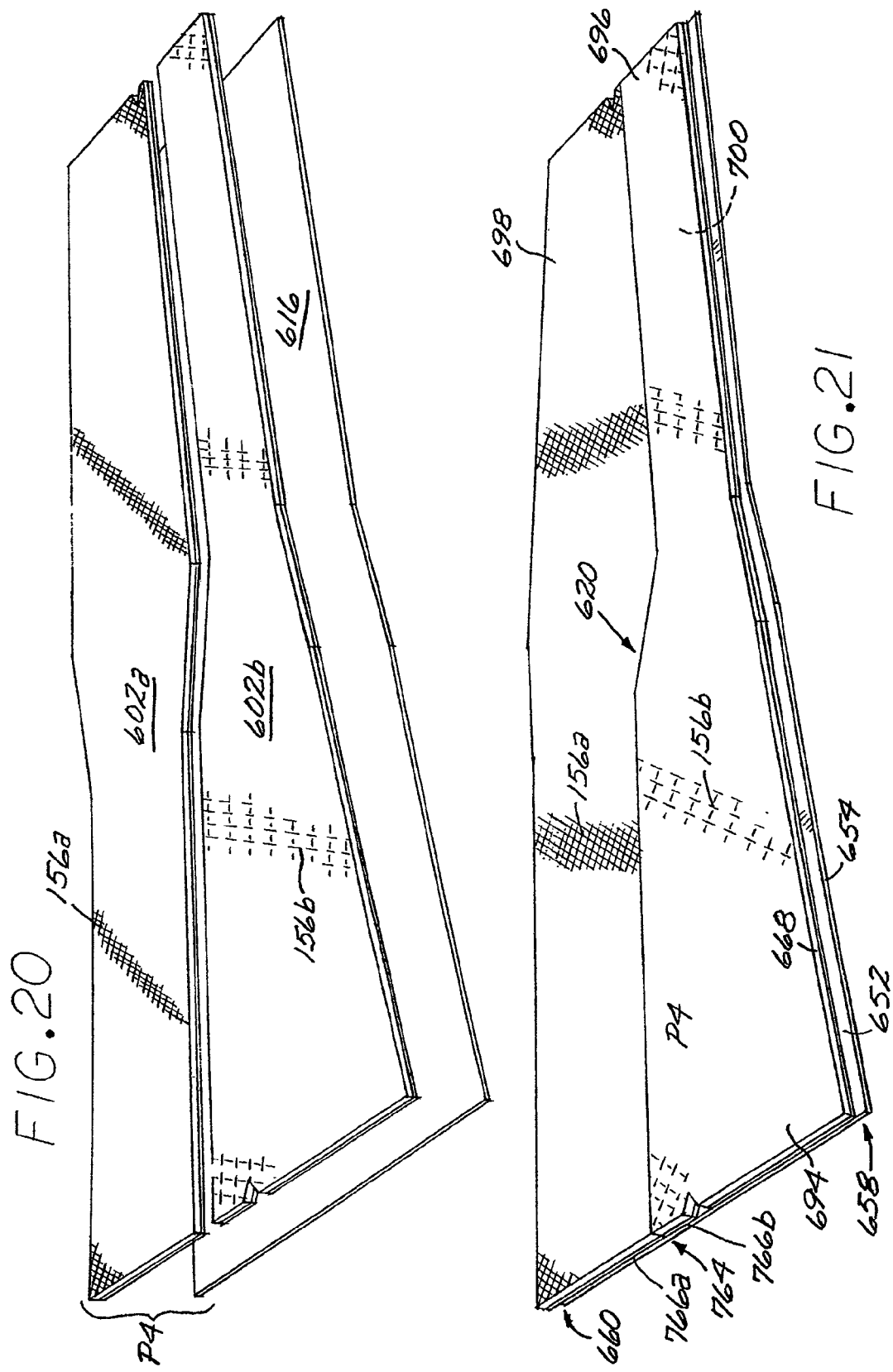

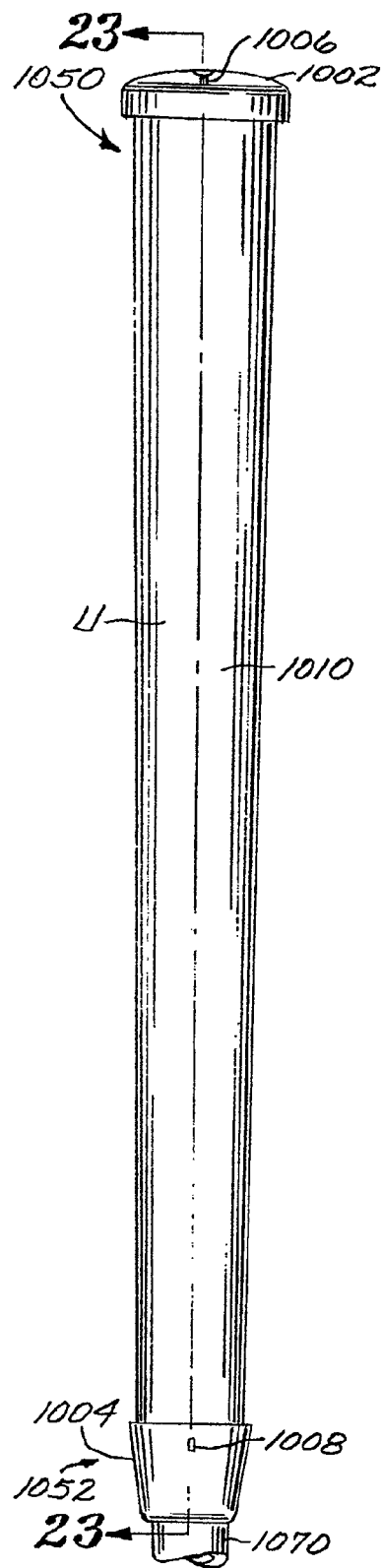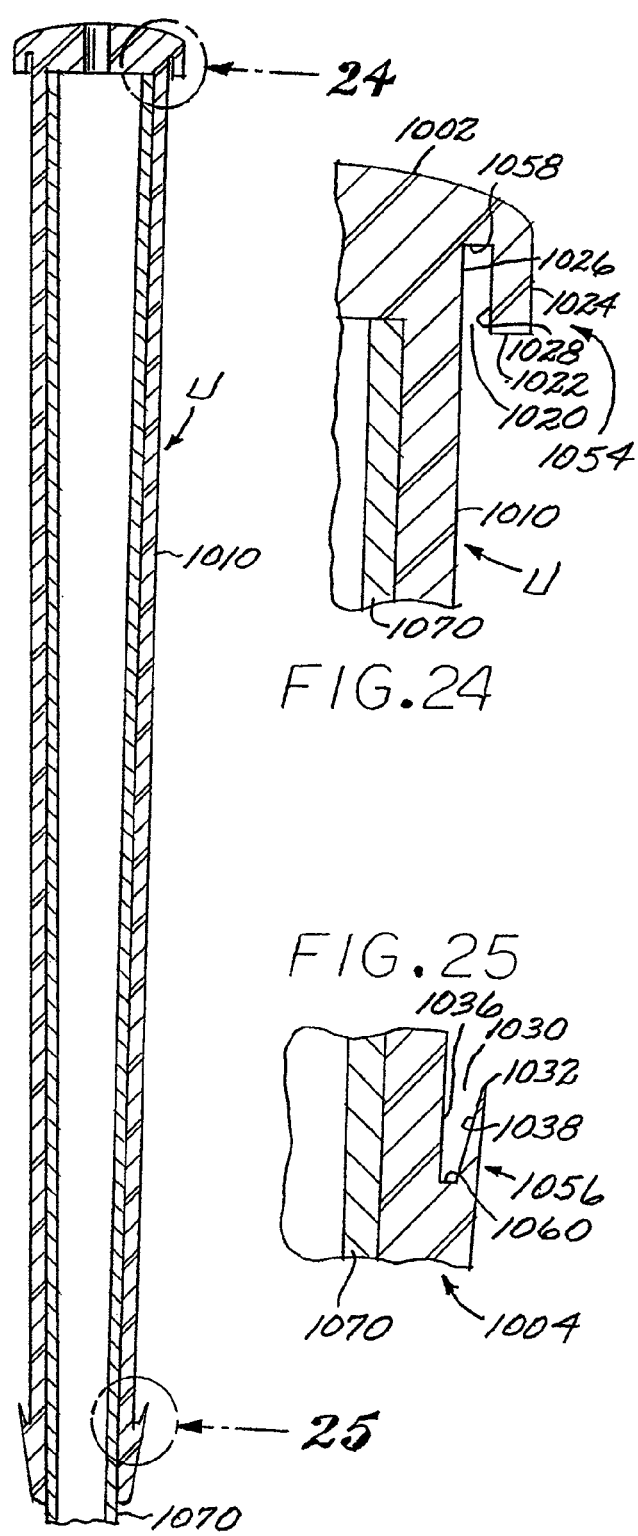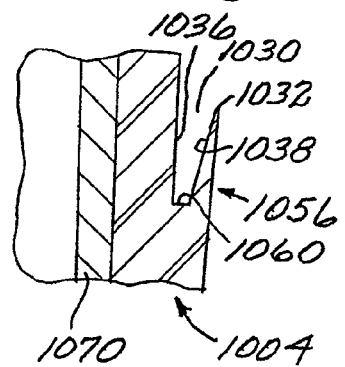

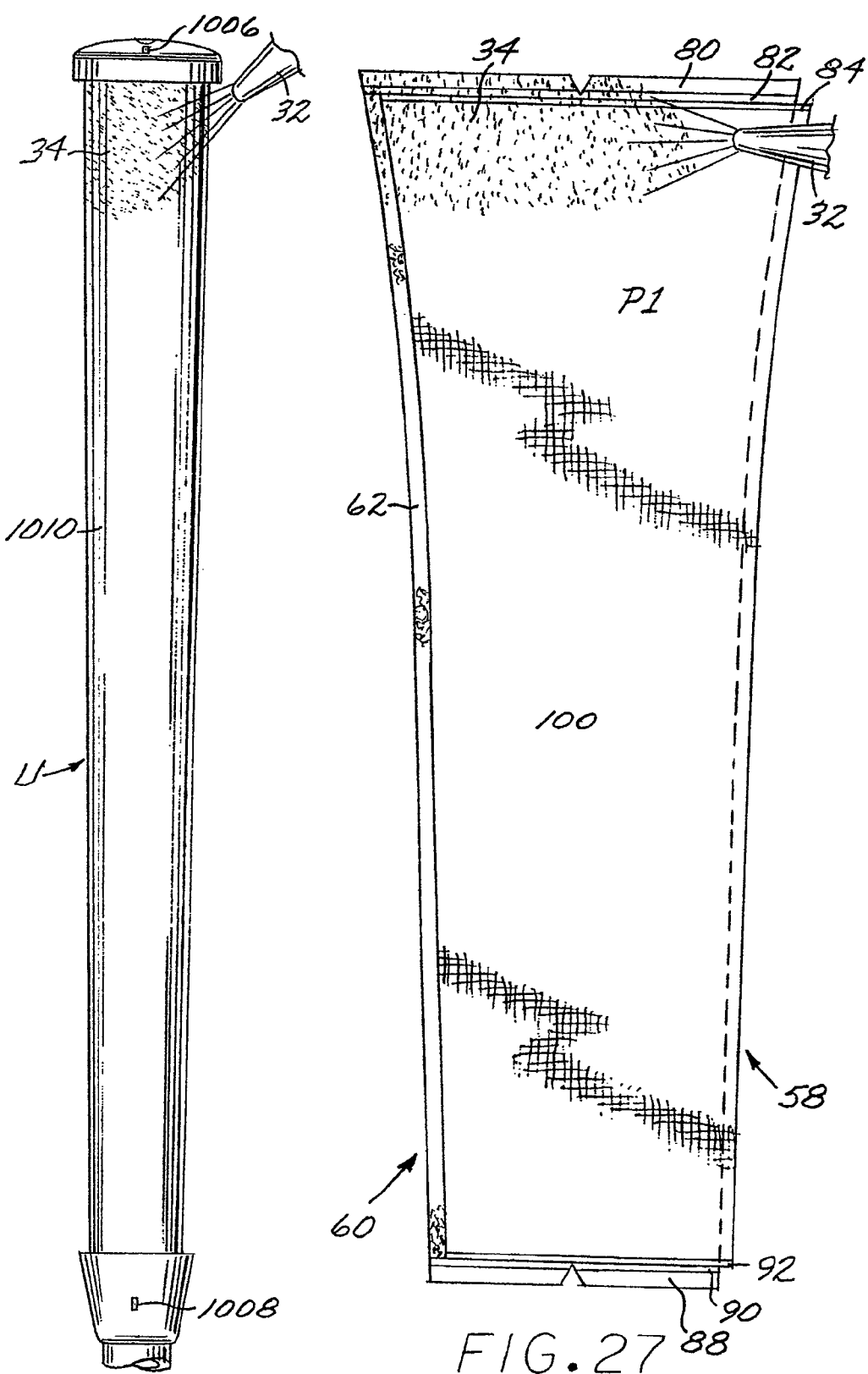

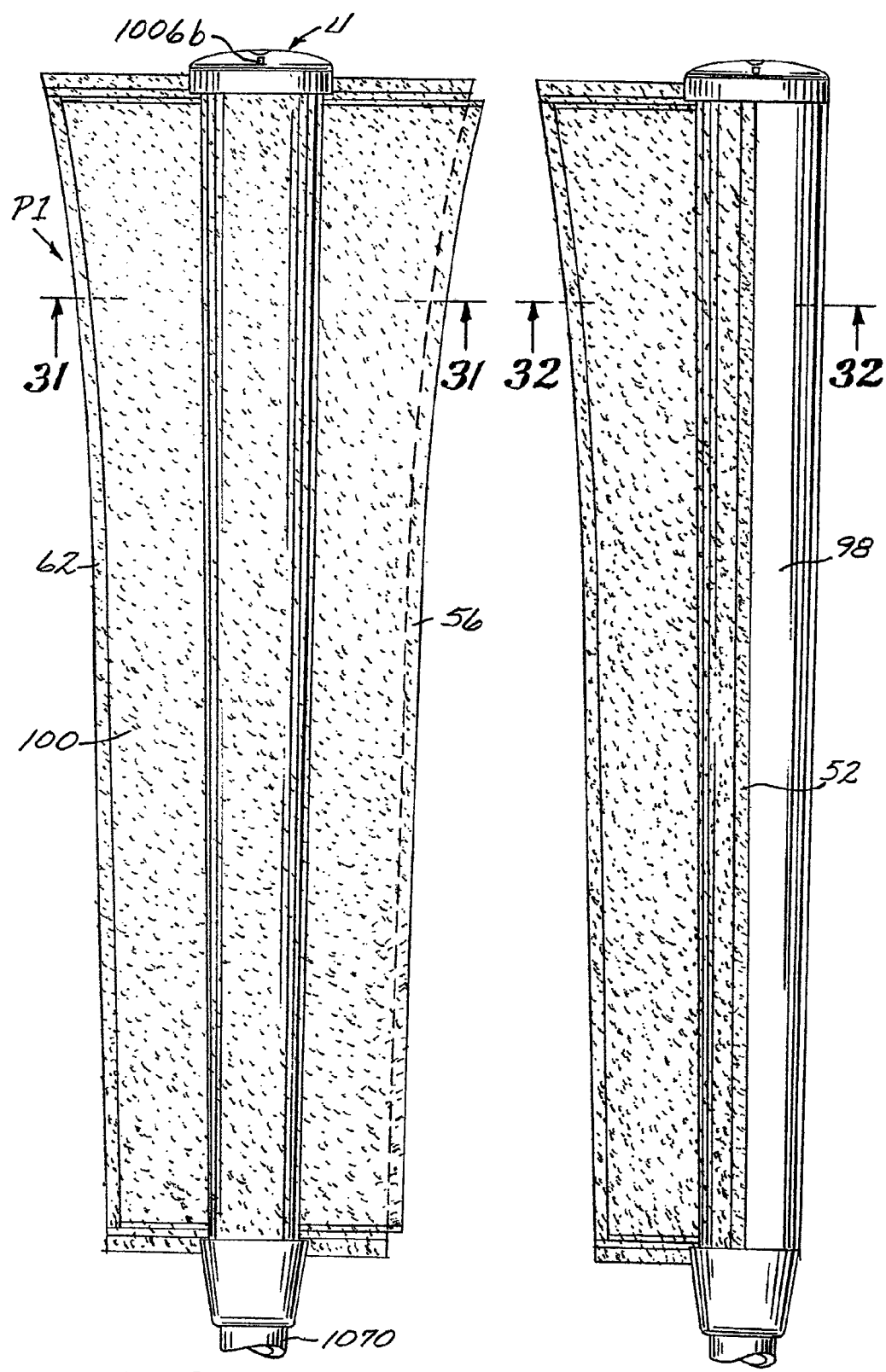

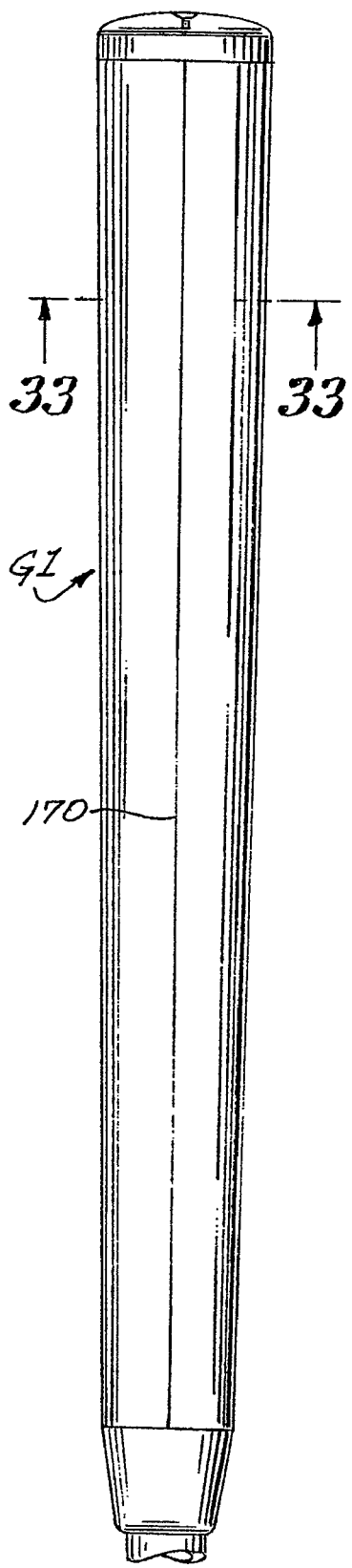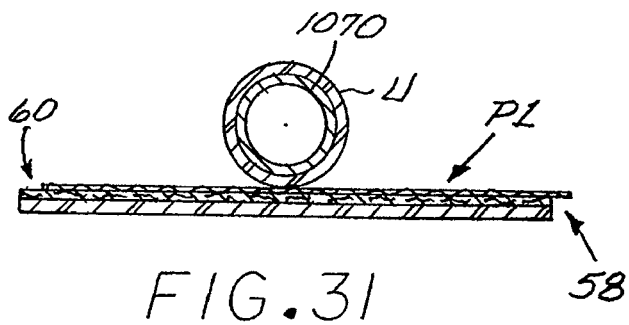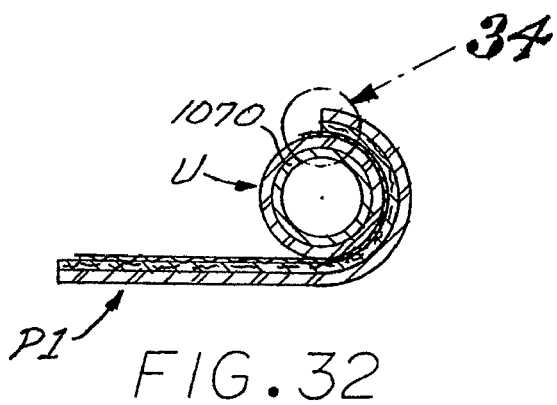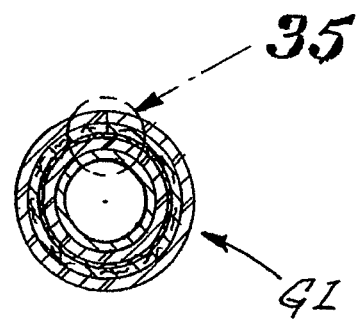
FIG.30
FIG.31
FIG.32
FIG.33

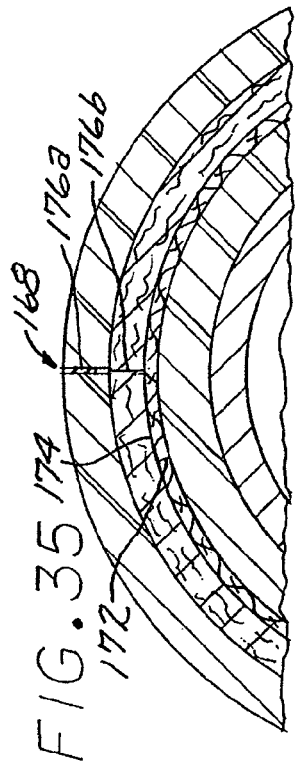
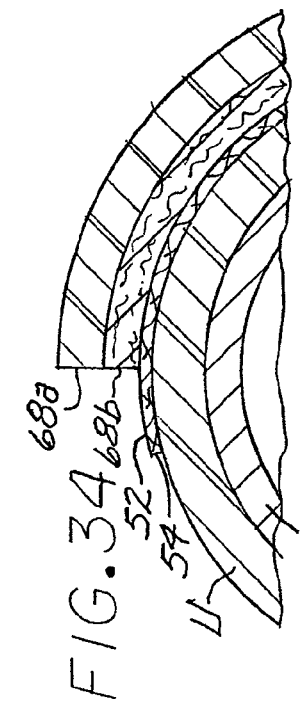
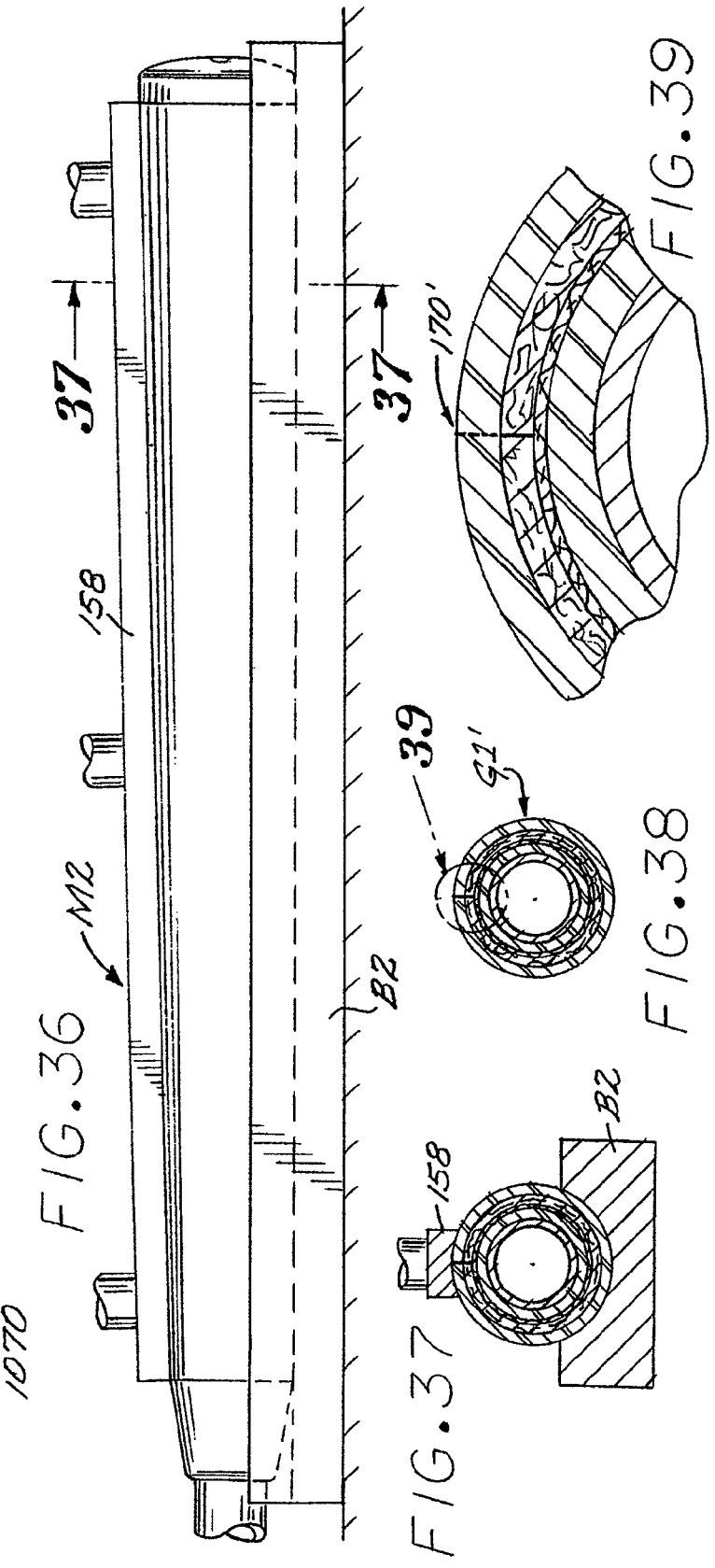
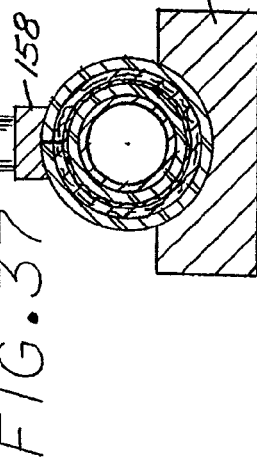

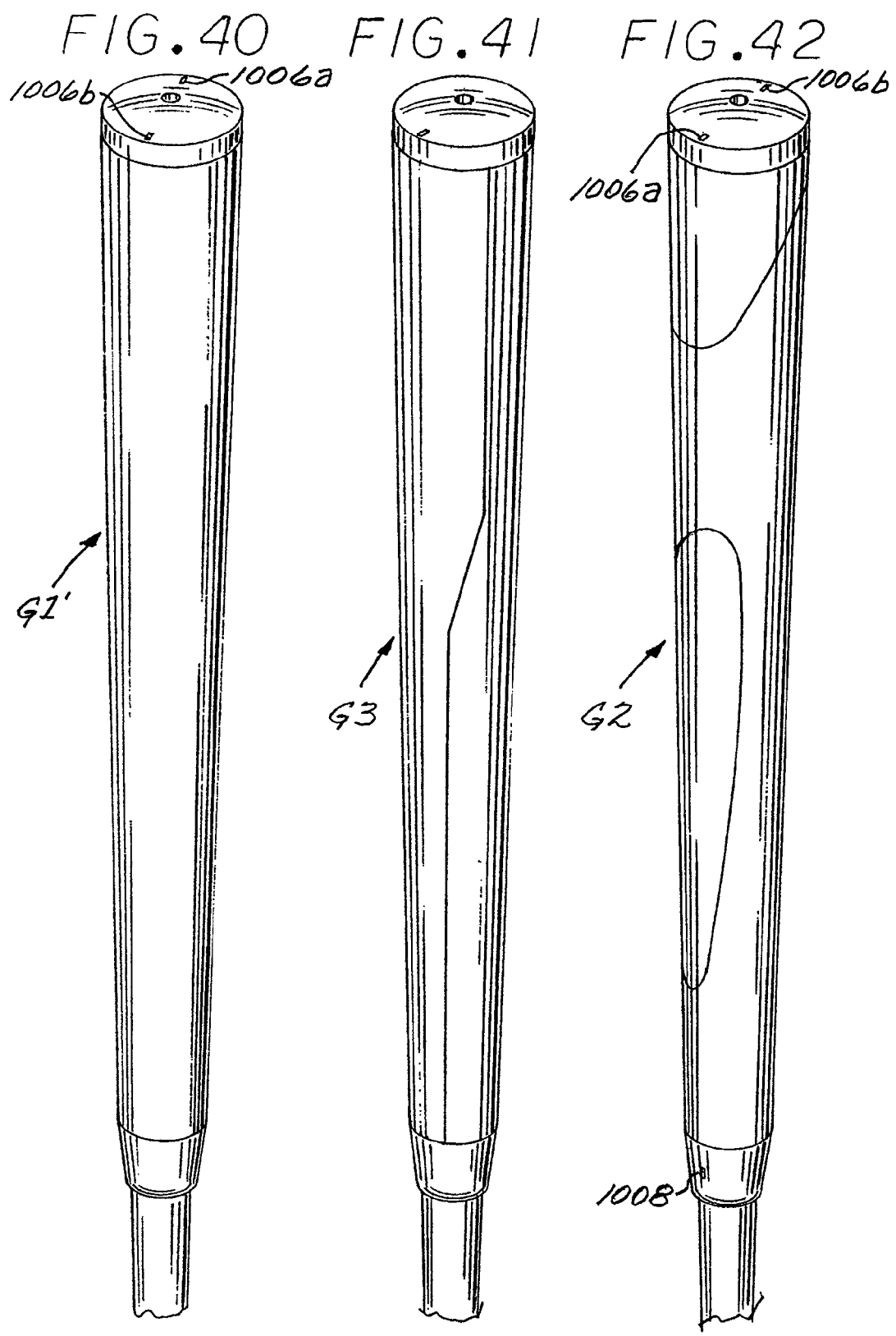

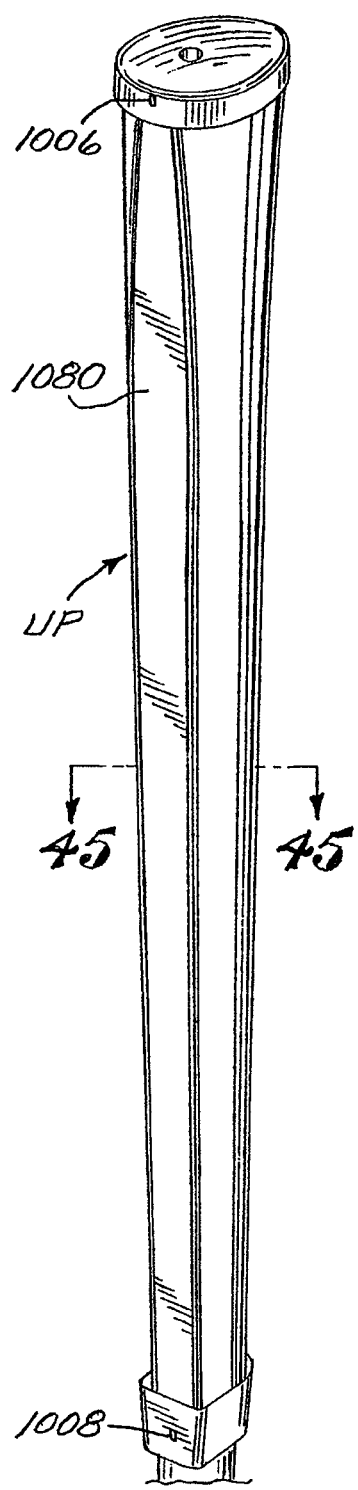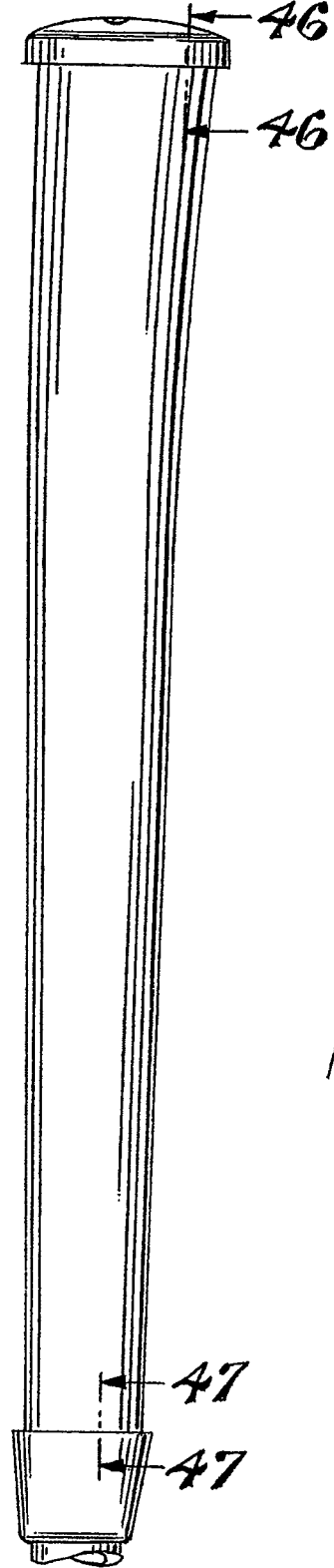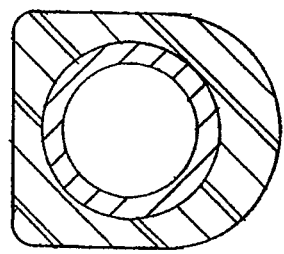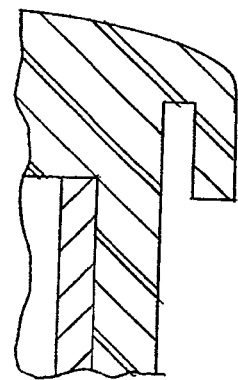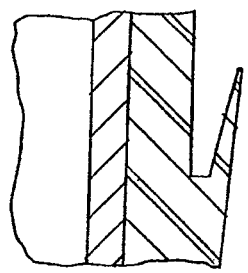

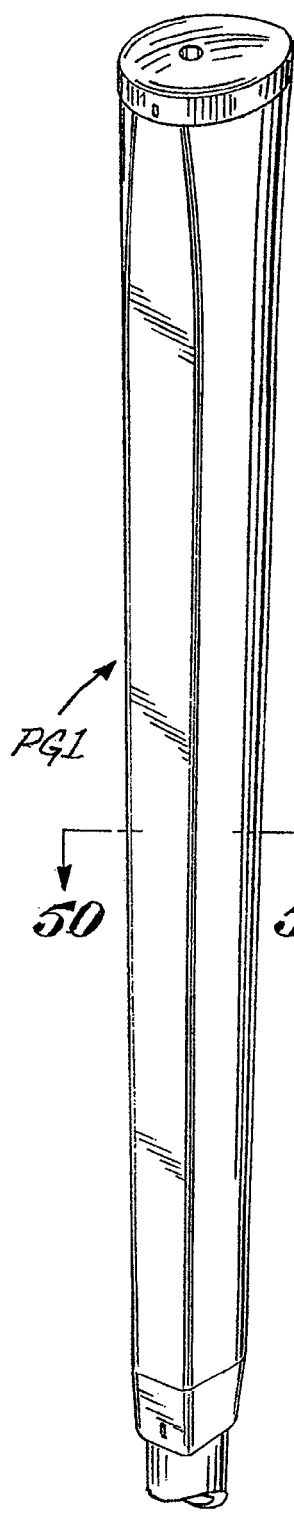
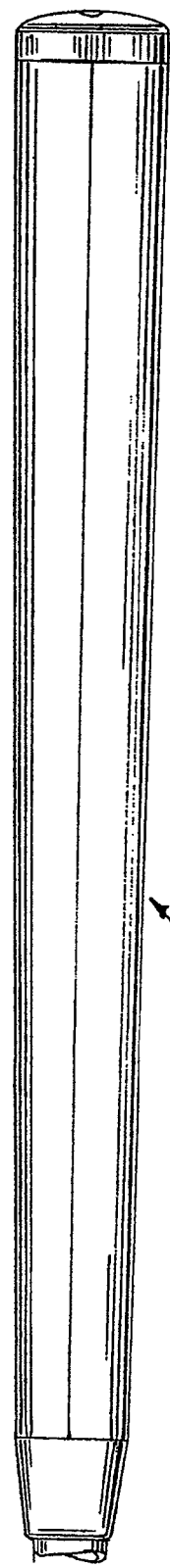
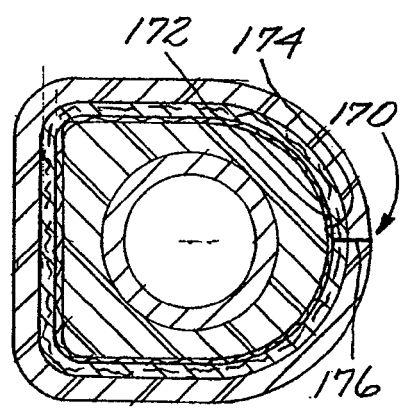
FIG.50
FIG.48
FIG.49

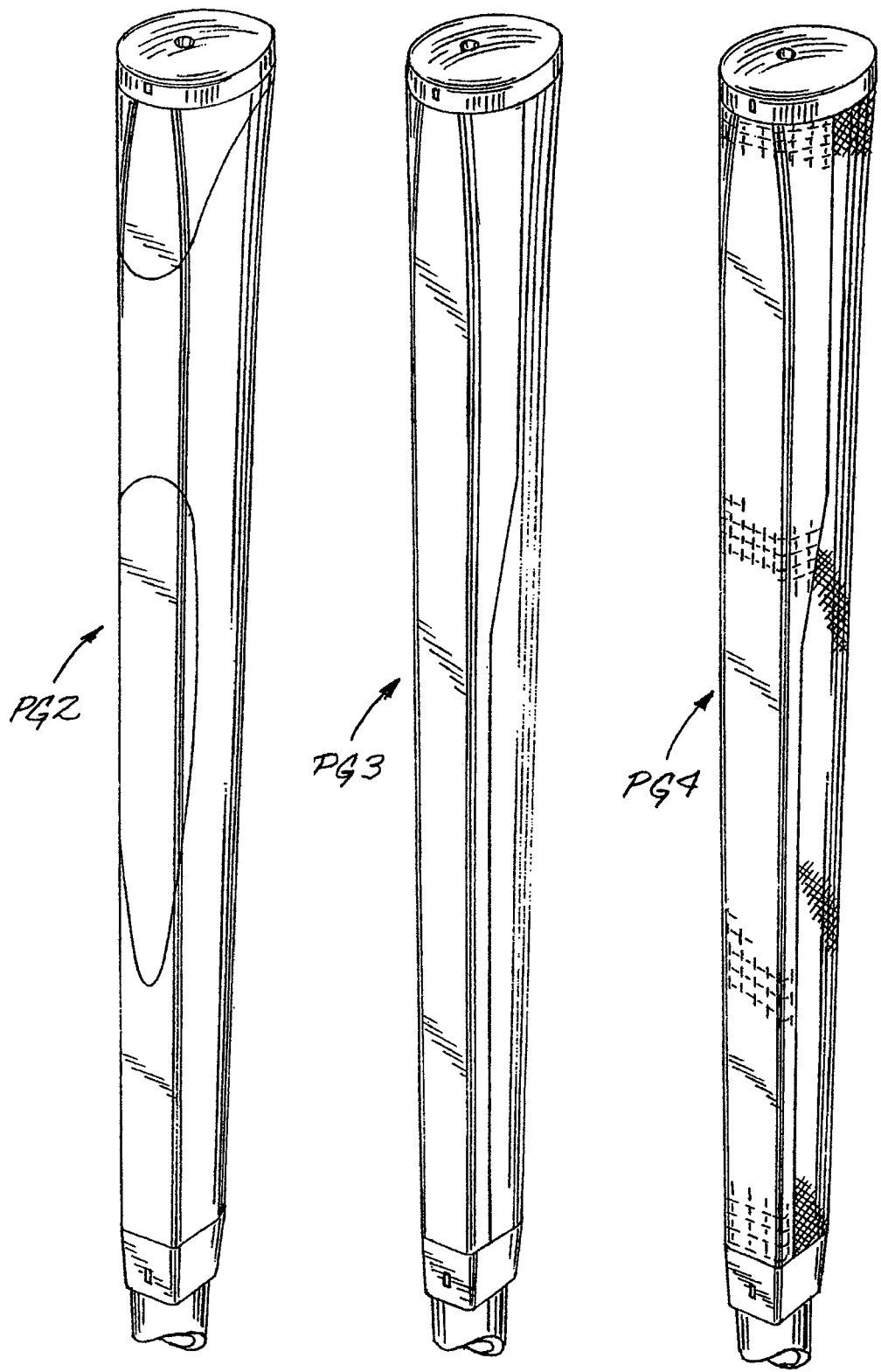

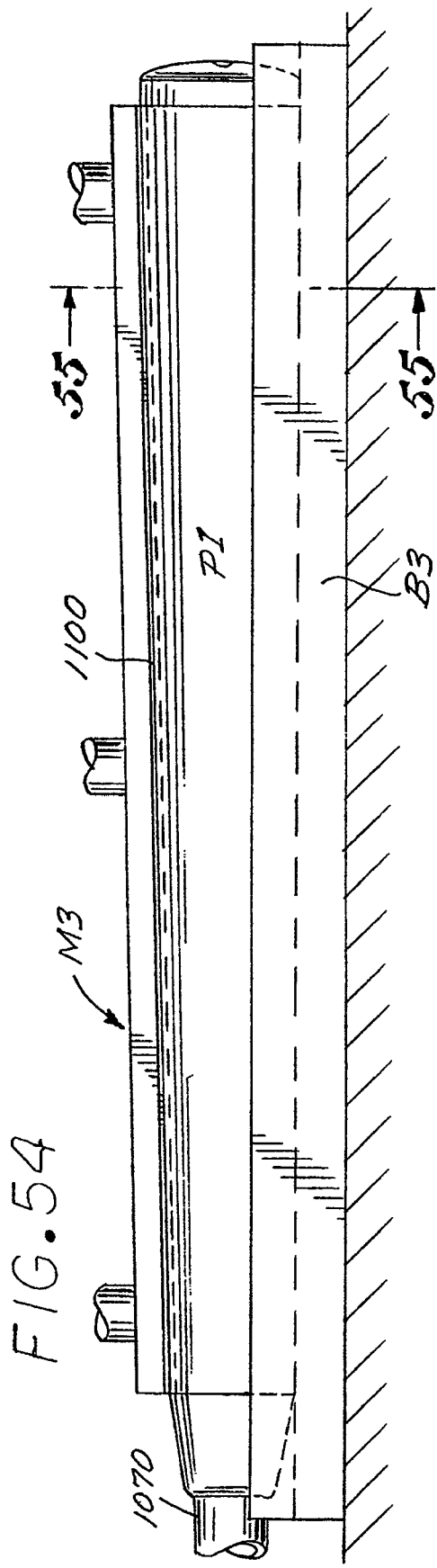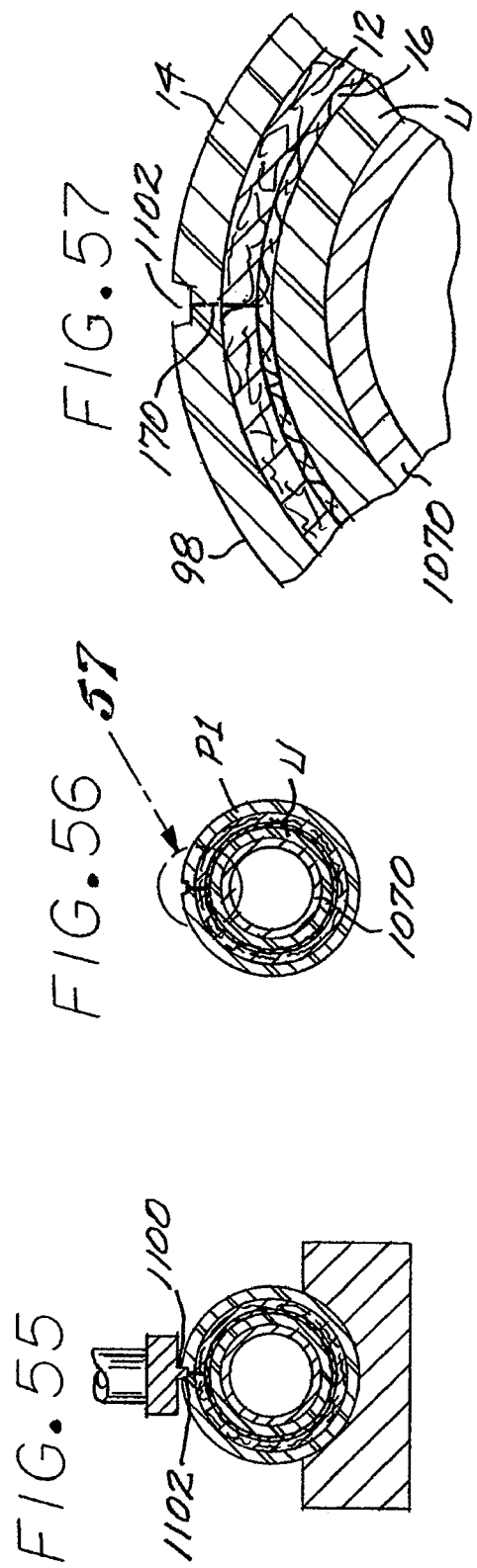

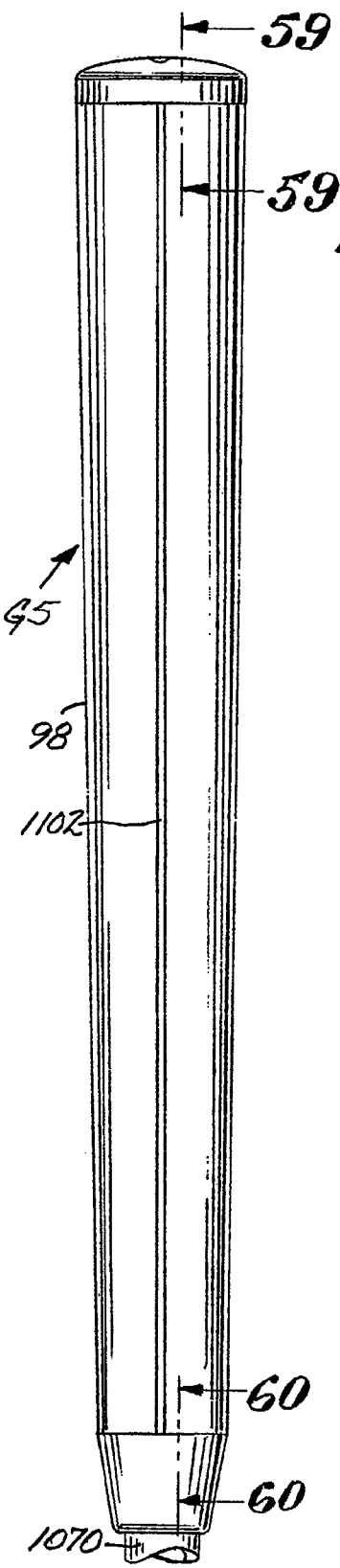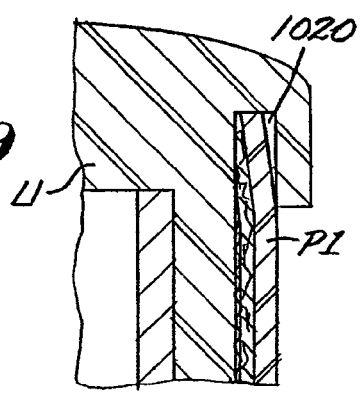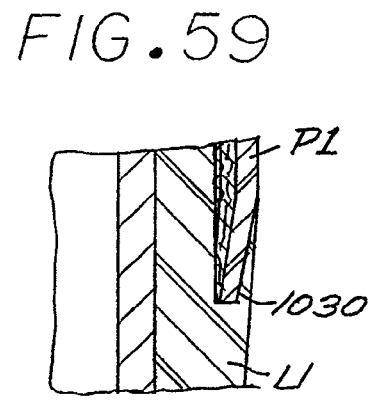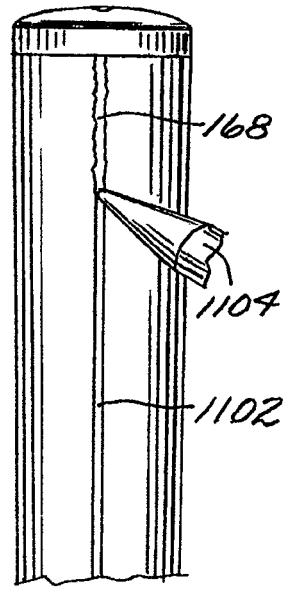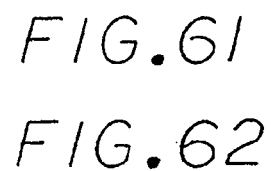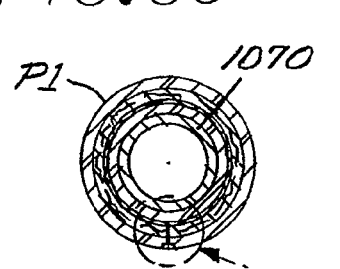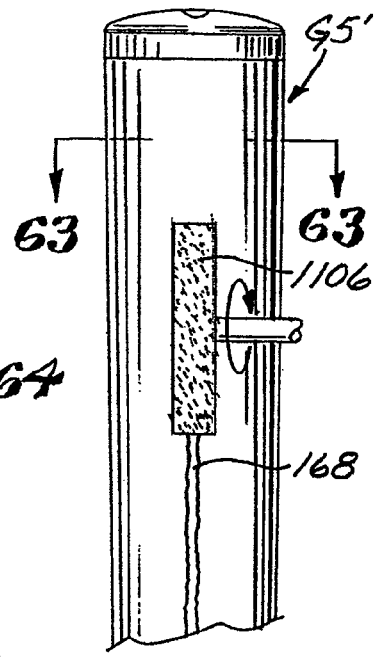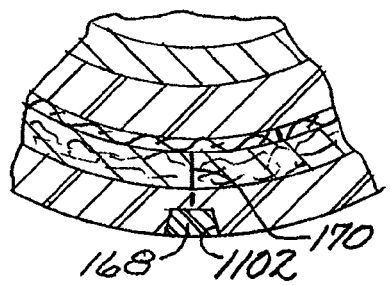

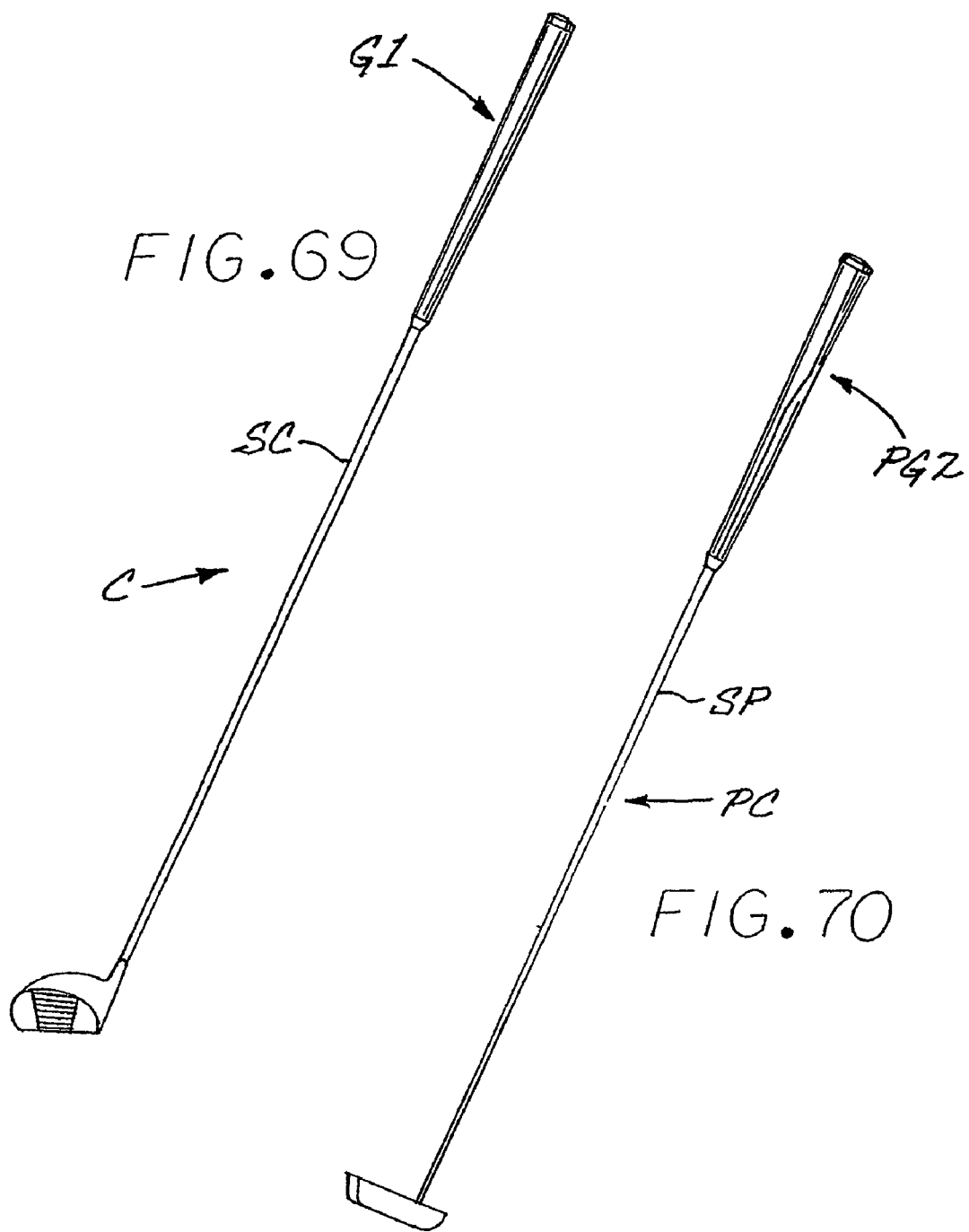

PANEL GRIP WITH MODIFIED SEAM

RELATED U.S. APPLICATION DATA

The present application is a continuation of U.S. patent application Ser. No. 11/172,770, filed Jul. 1, 2005.

BACKGROUND OF THE INVENTION

1. Field of the Invention

This application relates to an improved grip for shafts. In particular, this application relates to an improved grip for the shafts of golf clubs.

2. Incorporation by Reference

This application hereby incorporates by reference, in their entirety, U.S. patent application Ser. No. 11/172,770, filed Jul. 1, 2005 and U.S. Pat. Nos. 6,244,975; 6,627,027; 6,695,713; 6,843,732; and 6,857,971.

3. Description of the Related Art

Applicant has previously developed resilient grips which successfully reduce impact shock to the muscle and arm joints of the users of golf clubs and also provide a feeling of tackiness between the player's hands and the grip. See, for example, U.S. Pat. No. 5,797,813 granted to Applicant on Aug. 25, 1998, U.S. Pat. No. 6,843,732 granted to Applicant on Jan. 18, 2005, and U.S. Pat. No. 6,857,971 granted to Applicant on Feb. 22, 2005.

The earliest of these grips utilize a polyurethane-felt strip which is spirally wrapped around an underlisting sleeve that is slipped onto and adhered to a golf club shaft. The sides of the strips are formed with overlapping heat depressed recessed reinforcement edges. While such grips have proven satisfactory in reducing impact shock, the fabrication is labor intensive, particularly since the strip must be wrapped manually about the underlisting sleeve within specific pressure parameters. Additionally, it is difficult to accurately align the adjoining side edges of the strip as such strip is being spiraling wrapped about the underlisting sleeve. These wrapped grips can become twisted during the wrapping process, allow for only limited display of decorative designs, and allow for only a limited placement of colors.

Applicant's U.S. Pat. No. 6,857,971 sought to overcome two of the aforementioned disadvantages of existing spirally wrapped grips while providing the same resistance to shock afforded by such grips, as well as providing tackiness. The disadvantages are eliminated by forming a structurally integral grip from a single polyurethane-felt panel having a configuration corresponding to the exterior shape of an underlisting sleeve. While this design removes the twisting problems associated with the wrapping process and offers more area to display decorative designs, it is limited in its ability to accommodate multiple color schemes which are so popular in today's modern world of golf.

Applicant's U.S. Pat. No. 6,843,732 sought to overcome the aforementioned disadvantages while still providing tackiness by incorporating multiple initially distinct two layer panels. Such a design allows grips made according to the teachings of U.S. Pat. No. 6,843,732 to accommodate multiple color combinations that would not have been possible with the single panel grips or the spirally wrapped grips of old.

While such grips have continued to prove satisfactory in reducing impact shock, the fabrication has our remained intensive, particularly since the panel is skived along the side edges so that the seams along the intersection of the side edges remain relatively smooth. Additionally, it is difficult to easily and efficiently skive various patterns in the single panel grips of the previous designs. The panel grips therefore allow for only limited display of decorative designs and limited placement of colors.

SUMMARY OF THE INVENTION

Embodiments of the golf club grip of the present invention overcome the aforementioned disadvantages of existing spirally wrapped grips and the single panel grips while providing the same resistance to shock afforded by such grips, as well as providing tackiness. Desirably, a structurally integral grip is formed from at least an outer panel and an inner panel coupled together in an offset mating relationship.

One preferred embodiment is a grip for use on the shaft of a golf club, including a preferably resilient underlisting sleeve, an outer multilayered panel, and an inner strength panel. The outer multilayered panel preferably comprises a top region, a bottom region, two side regions extending between the top and bottom regions, an inner surface, and an outer surface. The outer multilayered panel preferably further comprises at least an inner strength layer and an outer tactile layer coupled together. The inner strength panel preferably comprises a top region, a bottom region, two side regions extending between the top and bottom regions, an outer surface, and an inner surface. Preferably, the outer panel and the inner panel are coupled together to form a coupled multilayered panel wherein the inner strength layer of the outer panel is coupled to the inner strength panel and the side regions of the outer panel and the inner panel are offset to form a first lateral extension substantially comprising the inner panel and a second lateral extension substantially comprising the outer panel. The first lateral extension preferably defines an outer abutment surface transverse to the outer surface of the multilayered panel, an intermediate abutment surface generally parallel to the outer surface of the multilayered panel, and an inner abutment surface also transverse to the outer surface of the multilayered panel. The second lateral extension preferably defines an outer abutment surface transverse to the outer surface of the multilayered panel, an intermediate abutment surface generally parallel to the outer surface of the multilayered panel, and an inner abutment surface transverse to the outer surface of the multi layered panel. Preferably, the coupled multilayer panel is wrapped about the underlisting sleeve such that the inner surface of the inner panel is coupled to the sleeve and the second lateral extension overlaps the first lateral extension to form an outer attachment interface, an intermediate attachment interface, and an inner attachment interface. The outer attachment interface preferably comprises at least a portion of the outer abutment surface of the first lateral extension formed by the tactile layer coupled to at least a portion of the outer abutment surface of the second lateral extension formed by the tactile layer. The intermediate attachment interface preferably comprises the intermediate abutment surface of the first lateral extension coupled to the intermediate abutment surface of the second lateral extension so that the inner strength panel is coupled to the inner strength layer of the outer panel. The inner attachment interface preferably comprises the inner abutment surface of the first lateral extension and the inner abutment surface of the second lateral extension.

Another preferred embodiment is a grip for use on the shaft of a golf club, including a preferably resilient underlisting sleeve, an outer multilayered panel, and an inner strength panel. The outer multilayered panel preferably comprises a top region, a bottom region, two side regions extending between the top and bottom regions, an inner surface, and an outer surface. The outer multilayered panel preferably further comprises at least an inner strength layer and an outer tactile layer coupled together and at least one internal seam extending between the inner and outer surfaces of the multilayered panel. The inner strength panel preferably comprises a top region, a bottom region, two side regions extending between the top and bottom regions, an outer surface, and an inner surface. Preferably, the outer panel and the inner panel are coupled together to form a coupled multilayered panel wherein the inner strength layer of the outer panel is coupled to the inner strength panel and the side regions of the outer panel and the inner panel are offset to form a first lateral extension substantially comprising the inner panel and a second lateral extension substantially comprising the outer panel. The first lateral extension defines an outer abutment surface transverse to the outer surface of the multilayered panel, an intermediate abutment surface generally parallel to the outer surface of the multilayered panel, and an inner abutment surface transverse to the outer surface of the multilayered panel. The second lateral extension defines an outer abutment surface transverse to the outer surface of the multilayered panel, an intermediate abutment surface generally parallel to the outer surface of the multilayered panel, and an inner abutment surface transverse to the outer surface of the multi layered panel. Preferably, the coupled multilayer panel is wrapped about the underlisting sleeve such that the inner surface of the inner panel is coupled to the sleeve and the second lateral extension overlaps the first lateral extension to form an outer attachment interface, an intermediate attachment interface, and an inner attachment interface.

Another preferred embodiment is a method of making a grip for use on the shaft of a golf club comprising the steps of: providing a resilient underlisting sleeve; providing an outer multilayered panel comprising a top region, a bottom region, two side regions extending between the top and bottom regions, an inner surface, and an outer surface, wherein the outer panel further comprises at least an inner strength layer and an outer tactile layer coupled together; providing an inner strength panel comprising a top region, a bottom region, two side regions extending between the top and bottom regions, an outer surface, and an inner surface; coupling the outer panel and the inner panel together to form a coupled multilayered panel, wherein the inner strength layer of the outer panel is coupled to the inner strength panel such that the side regions of the outer panel and the inner panel are offset to form a first lateral extension substantially comprising the inner panel and a second lateral extension substantially comprising the outer panel, the first lateral extension defining an outer abutment surface transverse to the outer surface of the multilayered panel, an intermediate abutment surface generally parallel to the outer surface of the multilayered panel and an inner abutment surface transverse to the outer surface of the multilayered panel, the second lateral extension defining an outer abutment surface transverse to the outer surface of the multilayered panel, an intermediate abutment surface generally parallel to the outer surface of the multilayered panel and an inner abutment surface transverse to the outer surface of the multi layered panel; wrapping the coupled multilayer panel about the underlisting sleeve; coupling the inner surface of the inner panel to the sleeve; and overlapping the second lateral extension over the first lateral extension to form an outer attachment interface, an intermediate attachment interface, and an inner attachment interface wherein the outer attachment interface comprising at least a portion of the outer abutment surface of the first lateral extension formed by the tactile layer coupled to at least a portion of the outer abutment surface of the second lateral extension formed by the tactile layer, the intermediate attachment interface comprising the intermediate abutment surface of the first lateral extension coupled to the intermediate abutment surface of the second lateral extension so that the inner strength panel is coupled to the inner strength layer of the outer panel, and the inner attachment interface comprising the inner abutment surface of the first lateral extension and the inner abutment surface of the second lateral extension.

Yet another preferred embodiment is a method of making a grip for use on the shaft of a golf club comprising the steps of: providing a resilient underlisting sleeve; providing a first outer multilayered panel comprising a top region, a bottom region, a first side region and a second side region, both side regions extending between the top and bottom regions, an inner surface, and an outer surface, wherein the outer panel further comprises at least an inner strength layer and an outer tactile layer coupled together; providing a second outer multilayered panel comprising a top region, a bottom region, a first side region and a second side region, both side regions extending between the top and bottom regions, an inner surface, and an outer surface, wherein the outer panel further comprises at least an inner strength layer and an outer tactile layer coupled together; providing an inner strength panel comprising a top region, a bottom region, two side regions extending between the top and bottom regions, an outer surface, and an inner surface; coupling the first and second outer panels and the inner panel together to form a coupled multilayered panel, wherein the inner strength layer of the first and second outer panels is coupled to the inner strength panel such that the second side region of the first outer panel and the first side region of the second outer panel and the side regions of the inner panel are offset to form a first lateral extension substantially comprising the inner panel and a second lateral extension substantially comprising the first outer panel, the first lateral extension defining an outer abutment surface transverse to the outer surface of the multilayered panel, an intermediate abutment surface generally parallel to the outer surface of the multilayered panel and an inner abutment surface transverse to the outer surface of the multilayered panel, the second lateral extension defining an outer abutment surface transverse to the outer surface of the multilayered panel, an intermediate abutment surface generally parallel to the outer surface of the multilayered panel and an inner abutment surface transverse to the outer surface of the multi layered panel; wrapping the coupled multilayer panel about the underlisting sleeve; coupling the inner surface of the inner panel to the sleeve; and overlapping the second lateral extension over the first lateral extension to form an outer attachment interface, an intermediate attachment interface, and an inner attachment interface wherein the outer attachment interface comprising at least a portion of the outer abutment surface of the first lateral extension formed by the tactile layer coupled to at least a portion of the outer abutment surface of the second lateral extension formed by the tactile layer, the intermediate attachment interface comprising the intermediate abutment surface of the first lateral extension coupled to the intermediate abutment surface of the second lateral extension so that the inner strength panel is coupled to the inner strength layer of the outer panel, and the inner attachment interface comprising the inner abutment surface of the first lateral extension and the inner abutment surface of the second lateral extension.

Another preferred embodiment is a method of making a grip for use on the shaft of a golf club comprising the steps of: providing a resilient underlisting sleeve; providing an outer multilayered panel comprising a top region, a bottom region, two side regions extending between the top and bottom regions, an inner surface, an outer surface, and at least one internal seam, wherein the outer panel further comprises at least an inner strength layer and an outer tactile layer coupled together; providing an inner strength panel comprising a top region, a bottom region, two side regions extending between the top and bottom regions, an outer surface, and an inner surface; coupling the outer panel and the inner panel together to form a coupled multilayered panel, wherein the inner strength layer of the outer panel is coupled to the inner strength panel such that the outer side regions of the outer panel and the side regions of the inner panel are offset to form a first lateral extension substantially comprising the inner panel and a second lateral extension substantially comprising the outer panel, the first lateral extension defining an outer abutment surface transverse to the outer surface of the multilayered panel, an intermediate abutment surface generally parallel to the outer surface of the multilayered panel and an inner abutment surface transverse to the outer surface of the multilayered panel, the second lateral extension defining an outer abutment surface transverse to the outer surface of the multilayered panel, an intermediate abutment surface generally parallel to the outer surface of the multilayered panel and an inner abutment surface transverse to the outer surface of the multi layered panel; wrapping the coupled multilayer panel about the underlisting sleeve; coupling the inner surface of the inner panel to the sleeve; and overlapping the second lateral extension over the first lateral extension to form an outer attachment interface, an intermediate attachment interface, and an inner attachment interface.

Other preferred embodiments include a grip and a method of making a grip for use with other impact imparting implements, including, but not limited to, tennis rackets, polo clubs, hockey sticks, badminton rackets, hammers, and the like. Further, such grips could also be adapted for use with other handles that are grasped by a user's hand wherein the features of the herein described invention could be useful and beneficial, including bicycle grips, walking sticks, tow rope handles for use with wakeboarding, water skiing, and the like, and other types of handles. The outer tactile layer of the outer multilayered panel used in various embodiments described herein is preferably bonded to the inner strength layer of the outer multilayered panel. More preferably, the outer tactile layer is coupled or adhered to the inner strength layer and most preferably, it is coagulated directly onto the inner strength layer. Preferably, the strength layers described herein are bonded together. More preferably, they are coupled together or adhered together and most preferably, they are glued together. Preferably, the outer tactile layers are bonded together. More preferably they are coupled or adhered together and most preferably, they are joined with liquid polyurethane.

Embodiments of the present invention may be manufactured at considerably less cost than existing spirally wrapped grips since it eliminates the intensive labor of spirally wrapping a strip around an underlisting sleeve within specific pressure parameters. Additionally, embodiments will not twist either during manufacture or after it is adhered to an underlisting sleeve. My new grip desirably has an appearance similar to conventional molded rubber grips so as to appeal to professional golfers and low-handicap amateurs, and also provides a greater area for the application of decorative designs. Further, embodiments of the present invention can also accommodate multiple color combinations, thus appealing to golfers and college programs who wish to display their school colors while playing the sport they love. Embodiments of the present invention are also cheaper to manufacture than previous panel designs because the additional step of skiving the side edges is eliminated. Embodiments of the present invention are very easy to install.

BRIEF DESCRIPTION OF THE DRAWINGS

Further objects, features, and advantages of the invention will become apparent from the following detailed description taken in conjunction with the accompanying figures showing illustrative embodiments of the invention, in which:

FIG. 1 is a rear view of an outer multilayered panel member of a panel grip according to one embodiment;

FIG. 2 is a front view of an inner strength panel member of a panel grip according to one embodiment;

FIG. 3 is a perspective view of an inner strength panel member being coupled to an outer multilayered panel member of a panel grip according to one embodiment;

FIG. 4 is a perspective view of a coupled multilayer panel member of a panel grip according to one embodiment;

FIG. 5 is a horizontal cross-sectional view taken along the line designated 5-5 in FIG. 4;

FIG. 6A is an enlarged view of the encircled area designated 6A in FIG. 5;

FIG. 6B is an enlarged view of the encircled area designated 6B in FIG. 5;

FIG. 7 is a side view showing the top and bottom regions of a panel member of one embodiment being skived;

FIG. 8 is a rear view of a panel member of one embodiment;

FIG. 9 is a perspective view of an inner strength panel member being coupled to an outer multilayered panel member of a panel grip according to one embodiment;

FIG. 10 is a perspective view of a coupled multilayer panel member of a panel grip according to one embodiment;

FIG. 11 is a horizontal cross-sectional view taken along the line designated 11-11 in FIG. 10;

FIG. 12A is a rear view of an outer multilayered panel member of a panel grip according to one embodiment;

FIG. 12B is a rear view of an outer multilayered panel member of a panel grip for use with the outer multilayered panel member of FIG. 12A;

FIG. 13 is a front view of an inner strength panel member of a panel grip according to one embodiment;

FIG. 14 is a perspective view of an inner strength panel member being coupled to outer multilayered panel members of a panel grip according to one embodiment;

FIG. 15 is a perspective view of a coupled multilayer panel member of a panel grip according to one embodiment;

FIG. 16 is a horizontal cross-sectional view showing a mold which may be utilized in forming a panel member of a panel grip according to one embodiment;

FIG. 17 is an enlarged view of the encircled area designated 17 in FIG. 16;

FIG. 18 is an enlarged view of a pattern that may be formed by the mold shown in FIGS. 16 and 17;

FIG. 19 is an enlarged view of another pattern that may be formed by the mold shown in FIGS. 16 and 17;

FIG. 20 is a perspective view of an inner strength panel member being coupled to outer multilayered panel members of a panel grip according to one embodiment;

FIG. 21 is a perspective view of a coupled multilayer panel member of a panel grip according to one embodiment;

FIG. 22 is it a front view of an underlisting sleeve member of a panel grip according to one embodiment;

FIG. 23 is a vertical cross-sectional view taken along the line designated 23-23 in FIG. 22;

FIG. 24 is an enlarged view of the encircled area designated 24 in FIG. 23;

FIG. 25 is an enlarged view of the encircled area designated 25 in FIG. 23;

FIG. 26 is a front view showing adhesive being applied to the exterior of an underlisting sleeve according to one embodiment;

FIG. 27 is a rear view showing adhesive being applied to a panel member of a panel grip according to one embodiment;

FIG. 28 is a rear view showing a panel member being coupled to an underlisting sleeve according to one embodiment;

FIG. 29 is a rear view of showing another step in a panel member being coupled to a underlisting sleeve according to one embodiment;

FIG. 30 is a rear view of a panel member coupled to an underlisting sleeve according to one embodiment;

FIG. 31 is a cross-sectional view taken along the line designated 31-31 in FIG. 28;

FIG. 32 is a cross-sectional view taken along the line designated 32-32 in FIG. 29;

FIG. 33 is a cross-sectional view taken along the line designated 33-33 in FIG. 30;

FIG. 34 is an enlarged view of the encircled area designated 34 in FIG. 32;

FIG. 35 is an enlarged view of the encircled area designated 35 in FIG. 33;

FIG. 36 is a horizontal side view showing a mold which may be utilized in forming a panel grip according to one embodiment;

FIG. 37 is a vertical cross-sectional view taken along the line designated 37-37 in FIG. 36;

FIG. 38 is a vertical cross-sectional view of a grip after application of the mold shown in FIGS. 36 and 37;

FIG. 39 is an enlarged view of the encircled area designated 39 in FIG. 38;

FIG. 40 is a perspective rear view of a grip according to one embodiment;

FIG. 41 is a perspective rear view of a grip according to one embodiment;

FIG. 42 is a perspective front view of a grip according to one embodiment;

FIG. 43 is a perspective front view of an underlisting sleeve member of a panel grip according to one embodiment;

FIG. 44 is a side view of the underlisting sleeve shown in FIG. 43;

FIG. 45 is a cross-sectional view taken along the line designated 45-45 in FIG. 43;

FIG. 46 is a vertical cross-sectional view taken along the line designated 46-46 in FIG. 44;

FIG. 47 is a vertical cross-sectional view taken along the line designated 47-47 in FIG. 44;

FIG. 48 is a perspective front view of a grip according to one embodiment;

FIG. 49 is a rear view of the grip shown in FIG. 48;

FIG. 50 is a cross-sectional view taken along the line designated 50-50 in FIG. 48;

FIG. 51 is a perspective front view of a grip according to one embodiment;

FIG. 52 is a perspective front view of a grip according to one embodiment;

FIG. 53 is a perspective front view of a grip according to one embodiment;

FIG. 54 is a horizontal side view showing a mold which may be utilized in forming a panel grip according to one embodiment;

FIG. 55 is a vertical cross-sectional view taken along the line designated 55-55 in FIG. 54;

FIG. 56 is a vertical cross-sectional view of a grip after application of the mold shown in FIGS. 54 and 55;

FIG. 57 is an enlarged view of the encircled area designated 57 in FIG. 56;

FIG. 58 is a rear view of a grip according to one embodiment;

FIG. 59 is a cross-sectional view taken along the line designated 59-59 in FIG. 58;

FIG. 60 is a cross-sectional view taken along the line designated 60-60 in FIG. 58;

FIG. 61 is a broken rear view showing a first step in making a modification to the grip shown in FIG. 58;

FIG. 62 is a broken rear view showing a second step in making a modification to the grip shown in FIG. 58;

FIG. 63 is a horizontal cross-sectional view taken along the line designated 63-63 in FIG. 62;

FIG. 64 is an enlarged view of the encircled area designated 64 in FIG. 63;

FIG. 69 is a perspective view of a golf club provided with a panel grip according to one embodiment; and FIG. 70 is a perspective view of a golf club provided with a panel grip according to one embodiment.

Figure 65:
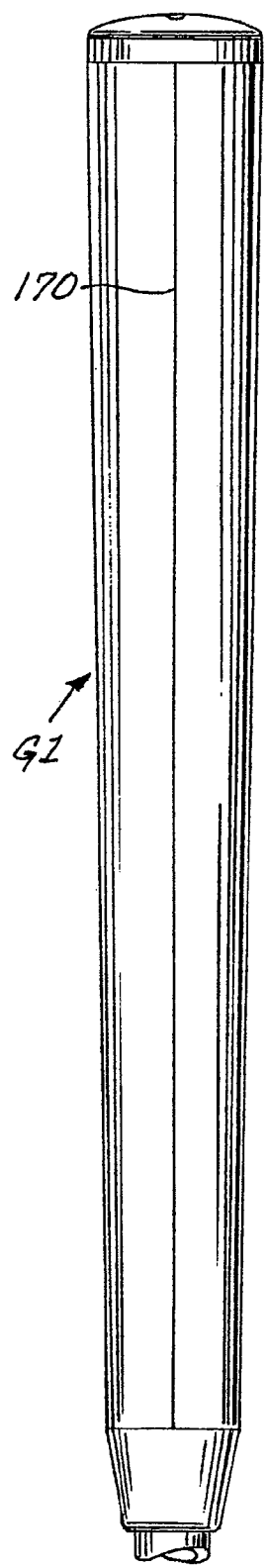
FIG. 65 a rear view of a panel member coupled to an underlisting sleeve and ready for modification according to one embodiment.

Throughout the figures, similar reference numerals and characters are generally used to denote like features, elements, components, or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE PREFERRED EMBODIMENT

Referring to the drawings, in FIG. 69, a panel grip G1 embodying the present invention is shown attached the shaft SC of a golf club C. In FIG. 70, a putter grip PG2 embodying the present invention is shown attached to the shaft SP of a putter PC. Referring now to the remaining drawings, a preferred form of a grip includes a coupled multilayer panel formed of an outer multilayered panel and an inner strength panel which is then wrapped about and coupled to a resilient underlisting sleeve of a conventional construction. Throughout the application, the term top is used to refer to that which is closest to the bottom end of the club opposite the club head, i.e. the end closest to the golfer if that golfer were to be swinging or stroking the club. Similarly, the term bottom is used to define that which is furthest from the butt end of the club.

FIG. 1 shows an outer multilayered panel 2 for use in constructing a coupled multilayered panel P1 (FIG. 4). Outer panel 2 is preferably cut, sliced, and/or otherwise removed and separated from a larger sheet of material (not shown). Outer panel 2 may also be formed according to practices well known to those of skill in the art. Preferably, outer panel 2 includes a top region 4, a bottom region 6, a first side region 8, and a second side region 10. Side region 8 includes a first outer abutment surface 36. Side region 10 includes a second outer abutment surface 38. Panel 2 also defines an inner surface 44 and an outer surface 46 and may also comprise centering notches 28 and 30. In other embodiments, panel 2 does not include notches. In still other embodiments, centering notches are formed in coupled multilayered panel P1 rather than in outer panel 2 prior to coupling to an inner strength layer 16 (FIG. 2).

Outer multilayered panel 2 also preferably comprises multiple layers. In one embodiment, panel 2 includes an inner strength layer 12 and an outer tactile layer 14. In the embodiment shown in FIG. 1, as will be understood by one of skill in the art, inner surface 44 corresponds to the inner surface of inner layer 12. Similarly, outer surface 46 corresponds to the outer surface of the outside layer 14. Preferably, outer tactile layer 14 comprises a polyurethane. Though polyurethane is the preferred material, other materials could be used and still achieve some advantages. In particular, other polymeric compounds can be used to create the outer layer and achieve some advantages. Similarly, the inner strength of layer 12 preferably comprises a felt. Though felt is preferred, it is understood that other fabric or textile layers can be used in an alternative embodiments of this invention. In another embodiment, the inner strength layer 12 may comprise a polymer, more preferably ethylene vinyl acetate (EVA).

The outer surface (not shown) of inner strength layer 12 is preferably bonded to the inner surface (not shown) of outer tactile layer 14. For purposes of this disclosure, the definition of bonding is intended to have a broad meaning, including commonly understood definitions of bonding, adhering, fixing, attaching, sewing, coupling, and gluing. When polyurethane is used in outer layer 14, such polyurethane is preferably coagulated to define pores (not shown). The polyurethane may be coagulated and bonded directly to inner strength layer 12, or may be first coagulated on an intermediary layer (not shown) and later attached to inner strength layer 12.

As noted above, outer multilayered panel 2 preferably comprises a felt inner strength layer 12 and a polyurethane outer tactile layer 14. The felt may be fabricated of wool, polyester, nylon, or mixtures thereof. Preferably, a nylon polyester felt will be utilized. The polyurethane may be formed in a conventional manner by coating one side of a felt strip with a solution of polyurethane (e.g., polyester, polyether) dissolved in dimethyl formamide (DMF), immersing the coated strip in water baths to displace the DMF and cause the urethanes to coagulate, and finally, driving off the water by the application of pressure and heat. The solids content of the polyurethane layer will vary in accordance with the desired hardness of such polyurethane layer. A preferred solids content solution is approximately 28.5-30.5%, with a viscosity range of about 60,000-90,000 cps measured at 25±0.5 degrees C. Suitable polyurethane ingredients can be purchased from the following companies:

Lidye Chemical Co., Ltd.
10F1 Lidye-Commercial Bldg.
22 Nanking W. Road, Taipei
Taiwan, R.O.C.
Lidye Chemical Co., Ltd.
No. 17, Ching Chien 6$^{th}$ Road
Guan in Industrial Area, Guan In Shiang
Taoyuan Hsien, Taiwan, R.O.C.
Lidye Resin (Panyu) Co., Ltd.
Xiadao Industrial Park
Liye Road, Dongchong Town
Panyu City, Guangdong Province, PRC Preferably, the thickness of the polyurethane will be in the range of about 0.1 to about 0.7 millimeters. More preferably, it will be in the range of about 0.3 to about 0.5 millimeters. Preferably, the thickness of the felt as used in the inner strength layer 12 is in the range of about 0.5 to about 2 millimeters. More preferably, it is in the range of about 0.8 to about 1.7 millimeters. Preferably, the felt as used in the inner strength panel 16 is in the range of about 0.05 to about 1.0 millimeters. More preferably, it is in the range of about 0.1 to about 0.5 millimeters. The outer tactile layer provides a cushioned grasping surface for a golfer's hands on a golf club and also enhances the golfer's grip by providing increased tackiness between the player's hand and the grip. The inner strength layer provides strength to the polyurethane layer.

FIG. 2 shows an inner strength panel 16. Inner panel 16 is preferably cut, sliced, and/or otherwise removed and separated from a larger sheet of material (not shown). Inner panel 16 may also be formed according to practices well known to those of skill in the art. Inner panel 16 includes a top region 18, a bottom region 22, a first side region 24, and a second side region 26. Panel 16 also includes an outer surface 48 and an inner surface 50. In FIG. 2, outer surface 48 is shown receiving an adhesive 34 by means of a nozzle 32. As will be appreciated by those of skill in the art, adhesive 34 may also be applied by means of a brush, pen, needle, adhesive tape, or the like. Side region 24 of panel 16 defines a first outer abutment surface 40. Side region 26 of panel 16 defines a second outer abutment surface 42. Inner strength panel 16 preferably comprises a textile or fabric material. More preferably, panel 16 comprises a felt as herein described above with respect to inner strength layer 12 of outer panel 2. Though felt is the preferable material, other materials could be used in the inner strength panel 16 and achieve some advantages. In particular, other polymeric compounds can be used to create inner panel 16 and achieve some advantages. In another embodiment, inner strength panel 16 may comprise a polymer, more preferably EVA. As discussed below, inner strength panel 16 serves as a means for attaching coupled multilayered panel P1 to underlisting sleeve U. Inner strength panel 16 also allows for incorporation of various additional inserts (see, e.g. FIGS. 9 and 10) and/or multiple outer panels (see, e.g. FIGS. 14 and 15).

FIGS. 3 and 4 show a coupled multilayered panel P1 being formed by coupling outer panel 2 with inner panel 16. As shown in FIG. 4, and in greater detail in FIGS. 5, 6A, and 6B, side regions 8, 10, 24, 26 of outer panel 2 and inner panel 16 are offset to form lateral extensions 58 and 60. FIG. 5 is a cross-sectional view of coupled panel P1 taken along the line designated 5-5 in FIG. 4. FIG. 5 shows a preferred embodiment comprising an outer tactile layer 14 bonded to an inner strength layer 12, which is in turn coupled to an inner strength panel 16. Coupled panel P1 has an outer surface 98, which, as will be understood by those of skill in the art, corresponds generally with outer surface 46 of outer tactile layer 14. Similarly, coupled panel P1 has an inner surface 100 generally corresponding to inner surface 50 of inner strength panel 16. In the completed grip G1, outer surface 98 of panel P1 will also generally refer to the outer surface of grip G1.

Outer panel 2 is preferably secured to inner strength panel 16 by adhesive 34 on inner surface 44 of outer panel 2. Outer panel 2 may also be secured to inner panel 16 by adhesive 34 on outer surface 48 of inner panel 16. Outer panel 2 and inner panel 16 may also be coupled by a combination of adhesive 34 on each of inner surface 44 of outer panel 2 and outer surface 48 of inner panel 16. The interface between inner panel 16 and outer panel 2 defines an intermediate interface 162.

FIG. 6B shows an enlarged view of a first lateral extension 58. First lateral extension 58 includes an inner abutment surface 54, an intermediate abutment surface 52, and an outer abutment surface 68. Outer abutment surface 68a of outer abutment surface 68 corresponds to the portion of outer tactile layer 14 that partially defines outer abutment surface 36 of outer multilayered panel 2. Similarly, outer abutment surface 68b of outer abutment surface 68 corresponds to the portion of inner strength layer 12 that partially defines outer abutment surface 36 of outer multilayered panel 2. First lateral extension 58 further comprises an inner surface 56. Preferably, the portion of inner strength panel 16 extending beyond side region 8 of outer panel 2 that partially defines first lateral extension 58 extends laterally from outer abutment surface 68 in the range of about 1.5 to about 5.0 millimeters. More preferably, it extends in the range of about 2.5 to about 3.5 millimeters. Most preferably, it extends about 3.0 millimeters.

FIG. 6A shows an enlarged view of a second lateral extension 60. Second lateral extension 60 includes an inner abutment surface 64, an intermediate abutment surface 62, and an outer abutment surface 66. Outer abutment surface 66a of outer abutment surface 66 corresponds to the portion of outer tactile layer 14 that partially defines outer abutment surface 38 of outer multilayered panel 2. Similarly, outer abutment surface 66b of outer abutment surface 66 corresponds to the portion of inner strength layer 12 that partially defines outer abutment surface 38 of outer multilayered panel 2. Preferably, the portion of outer multilayered panel 2 extending beyond side region 26 of inner panel 16 that partially defines second lateral extension 60 extends laterally from outer abutment surface 66 in the range of about 1.5 to about 5.0 millimeters. More preferably, it extends in the range of about 2.5 to about 3.5 millimeters. Most preferably, it extends about 3.0 millimeters. In preferred embodiments, first and second lateral extensions 58 and 60 extend substantially equal distances from their respective abutment surfaces 68 and 66.

Preferably, top region 94 and bottom region 96 of panel P1 are skived as shown in FIG. 7. The preferred method is to skive top region 94 of panel P1 downwardly and outwardly from inner surface 100 to outer surface 98 with rotating knife 74 while skiving bottom region 96 of panel P1 in a similar manner with rotating knife 76. During the preferred skiving method, panel P1 is secured to base 72 by pressure plate 70 and has its inner surface 100 facing pressure plate 70 and its outer surface 98 facing base 72.

FIG. 8 is a rear view of a preferred coupled multilayered panel P1. Skiving of top region 94 and bottom region 96 results in skived top region 78 and skived bottom region 86, respectively. In a preferred embodiment, knives 74 and 76 have cut at least partially through all layers of panel P1. As such, skived top region 78 defines skived top portion 80 of outer tactile layer 14, skived top portion 82 of inner strength layer 12, and skived top portion 84 of inner strength panel 16. Similarly, skived bottom region 86 defines skived bottom portion 88 of outer tactile layer 14, skived bottom portion 90 of inner strength layer 12, and skived bottom portion 92 of inner strength panel 16. In alternative embodiments, knives 74 and 76 only skive some of the layers of panel P1.

Coupled multilayered panel P1 is coupled to underlisting sleeve U to form grip G1, as shown in FIG. 30 and described herein below. A modified version of panel P1 may also be coupled to putter underlisting sleeve PU to form grip PG1 (see FIG. 48).

FIGS. 9, 10, and 11 show another preferred embodiment of the present invention. Coupled panel P2 comprises four main portions in the illustrated embodiment. In FIG. 9, inner strength panel 216 is similar to inner strength panel 16 used in coupled panel P1. Outer multilayered panel 202 defines a first opening 318 and an additional second opening 330. First opening 318 is shown as a modified oval which is defined by a first inner region 392 of the panel 202. However, first opening 318 may be shaped as a circle, an oval, a square, a rectangle, or any of a variety of different shapes, either regular or irregular in size and dimension. Further, these shapes may be wholly enclosed within panel 202 as illustrated by opening 318 or they may border on the edge of panel 202 and include an outer peripheral extremity of the panel 202 as illustrated by second opening 330. Second opening 330 is defined by a second inner region 398 of the panel 202.

First insert 310 is shaped to correspond to first opening 318 and is defined by an outer region 390. Though the materials may be different, first insert 310 is preferably the same thickness as outer multilayered panel 202 such that panel P2 is substantially the same thickness when measured through first insert 310 and through outer panel 202 after first insert 310 and outer panel 202 are adhered to inner strength panel 216. Similarly, second insert 322 is shaped to correspond to opening 330 and is defined by an outer region 396. Preferably, second insert 322 includes centering notch 328. In alternative embodiments, notches are not included. The shape of second insert 322 and corresponding second opening 330 are for illustration purposes only and many other shapes are envisioned to be included in the present disclosure. Like first insert 310, second insert 322 is preferably the same thickness as outer multilayered panel 202 even if the materials selected to make second insert 322 differ from the materials selected to make panel 202. The inserts 310 and 322 desirably define a surface area of at least 3 square inches to facilitate each of handling and to provide a significant area of highlighting to provide a pleasing appearance. In alternative embodiments, inserts may be smaller or larger, and included in lesser and fewer numbers, to achieve desired effects.

First insert 310 is preferably secured to inner strength panel 216 by adhesive 34 on inner surface 316 of first insert 310. First insert 310 may also be secured to panel 216 by adhesive 34 on outer surface 248 of inner panel 216. First insert 310 and inner panel 216 may also be coupled by a combination of adhesive 34 on each of inner surface 316 of first insert 310 and outer surface 248 of inner panel 216. The interfaces between inner panel 216 and outer panel 202, and inner panel 216 and first insert 310, partially define intermediate interface 362. First insert 310 may also be directly coupled to outer panel 202. First insert 310 preferably defines an outer abutment surface 312. Outer abutment surface 312, in turn, is comprised of an outer abutment surface 312a corresponding to outer tactile layer 334 of first insert 310 and an outer abutment surface 312b corresponding to inner strength layer 336 of first insert 310. First opening 318 defines outer abutment surface 320, which, in turn, is comprised of an outer abutment surface 320a corresponding to outer tactile layer 214 of outer panel 202 and an outer abutment surface 320b corresponding to inner strength layer 212 of outer panel 202.

FIG. 11 is a cross-sectional view of first insert 310 and outer panel 202 coupled with inner panel 216 and shows outer attachment interface 360 between outer abutment surface 312 of first insert 310 and outer abutment surface 320 of outer panel 202. Preferably, outer abutment surfaces 312a and 320a are coupled to form outer attachment interface 360a while outer abutment surfaces 312b and 320b are coupled to form outer attachment interface 360b. The outer surface 248 of inner panel 216 cooperates with the inner surface 316 of first insert 310, the inner surface 328 of second insert 322, and the inner surface 244 of outer panel 202 to define intermediate attachment surface 362.

FIG. 11 also shows intermediate attachment interface 362. Intermediate attachment interface 362 comprises intermediate attachment surfaces 362a, 362b, and 362c. Intermediate attachment surface 362a is defined by the interface between the outer surface 248 of inner panel 216 and the inner face 316 of first insert 310. Intermediate attachment surface 362b is defined by the interface between the outer surface 248 of inner panel 216 and the inner face 344 of outer panel 202. Intermediate attachment surface 362c is defined by the interface between the outer surface 248 of inner panel 216 and the inner face 328 of second insert 322. Internal insert seam 400 is generally defined by outer attachment surface 360 and intermediate attachment surface 362a. Insert seam 400 does not extend through inner panel 216. Such a structure provides additional support similar to the overlapping extension structure discussed herein. Such support helps prevent separation of the outer panel and the insert from the inner panel, both along the intermediate attachment interface as well as along the outer attachment interface.

In one embodiment, adhesive 34 is used to couple surfaces 312 and 320. In an alternative embodiment, adhesive 34 is used to couple outer abutment surfaces 312b and 320b. Outer abutment surfaces 312a and 320a are preferably coupled with a different adhesive, e.g. injected liquid polyurethane 168 (shown in FIG. 35 along a portion of seam 170). Polyurethane 168 may be inserted by a nozzle, needle, pen, or the like (not shown). Excessive coupling agent, be it adhesive 34, liquid polyurethane 168, or some other agent known to those of skill in the art, may be removed from outer surface 298 of panel P2 to maintain its generally uniform thickness by buffing, scrubbing, wiping, or similar means. Alternatively, the coupling agent is not removed.

Second insert 322 is coupled to outer panel 202 and inner strength panel 216 in a similar manner. An advantage of embodiments of the present invention includes the possibility of incorporating multiple colors in innovative designs on a grip while maintaining the integrity of the outer surface of the grip, including its substantially uniform thickness, its tacky feel, and its ability to cushion the user's hands.

Coupled multilayered panel P2 is coupled to underlisting sleeve U to form grip G2, as shown, for example, in FIG. 42 and described herein below. A modified version of panel P2 may also be coupled to putter underlisting sleeve PU to form grip PG2 as shown in FIG. 51.

Referring now to FIGS. 12 through 15, there is shown yet another embodiment of the present invention. Coupled multilayered panel P3 is formed from components similar to those used to form panels P1 and P2. Inner strength layer 416 is coupled to outer multilayered panels 402a and 402b such that first and second lateral extensions 458 and 460, respectively, are formed, as shown in FIG. 15. Preferably, panel P3 is shaped such that when it is wrapped about an underlisting sleeve U, it generally covers exposed surface 1010 of underlisting sleeve U as described below. Outer panels 402a and 402b may include centering notches 428, 430. In some embodiments, notches 428, 430 are not included.

Outer panels 402a and 402b are preferably secured to inner strength panel 416 by adhesive 34 on their inner surfaces 444a and 444b, respectively. Outer panels 402a and 402b may also be secured to inner panel 416 by adhesive 34 on outer surface 448 of panel 416. Outer panels 402a and 402b may also be coupled to inner panel 416 by a combination of adhesive 34 on each of inner surface 444a and 444b of outer panels 402a and 402b, respectively, and outer surface 448 of inner panel 416.

Desirably, outer panel 402a may be directly coupled to outer panel 402b. Panel 402a defines an outer abutment surface 436a. Outer abutment surface 436a, in turn, comprises an outer abutment surface 436aa corresponding to outer tactile layer 414a of outer panel 402a and an outer abutment surface 436ab corresponding to inner strength layer 412a of outer panel 402a. Outer panel 402b defines an outer abutment surface 438b. Outer abutment surface 438b, in turn, comprises an outer abutment surface 438ba corresponding to outer tactile layer 414b of outer panel 402b and an outer abutment surface 438bb corresponding to inner strength layer 412b of outer panel 402b. Preferably, outer abutment surfaces 436a and 438b form internal outer attachment interface 564. Internal outer attachment interface 564, in turn, comprises outer attachment interface 564a formed by outer abutment surfaces 436aa and 436ba and outer attachment interface 564b formed by abutment surfaces 436ab and 436bb. In this embodiment, outer attachment interface 564 preferably extends substantially the distance between top region 404 of outer panel 402 and bottom region 406 of outer panel 402, thereby defining first and second sections of outer panel 402. In alternative embodiments, outer panel 402 may include additional sections connected in a similar manner.

Outer surface 448 of inner panel 416 cooperates with inner surfaces 444a and 444b of outer panels 402a and 402b, respectively, to define intermediate attachment interface 566. Intermediate attachment interface 566, in turn, comprises intermediate attachment interface 566a corresponding to outer surface 448 of inner panel 416 and inner surface 444a of outer panel 402a and intermediate attachment interface 566b corresponding to outer surface 448 of inner panel 416 and inner surface 444b of outer panel 402b. Internal seam 420 is generally an interface connecting portions of panel 402 other than the interface between first and second lateral extensions 458 and 460. Structures described above provide additional support to panel interfaces similar to the overlapping extension structure discussed herein to resist the forces imparted on the grip as it is used by the golfer.

In the illustrated embodiment, first side region 408b of outer panel 402b is an outer side region 408b of outer panel 402. Outer side region 408b of outer panel 402 cooperates with first side region 424 of inner panel 416 to define first lateral extension 458. Similarly, second side region 410a of outer panel 402a is also an outer side region 410a of outer panel 402. Outer side region 410a of outer panel 402, in turn, cooperates with second side region 426 of inner panel 416 to define second lateral extension 460.

Coupled multilayered panel P3 is, for example, coupled to underlisting sleeve U to form grip G3, as shown, for example, in FIG. 41 and described herein below. A modified version of panel P3 may also be coupled to putter underlisting sleeve PU to form grip PG3 (see FIG. 52).

Note that an added advantage of the present invention is that it allows for multiple variations to a grip which may include additional vertical panels, as shown in, for example, FIGS. 12 through 15. In other embodiments, not shown, multiple horizontal panels are incorporated with and without the other modifications described herein. In still other embodiments, as will be understood by one of skill in the art, multiple inner strength layers are used in conjunction with various designs while still keeping within the spirit of the present disclosure.

Referring now to FIGS. 16 through 19, there is shown a first mold M1 which is utilized to form a friction enhancing pattern 156. Friction enhancing pattern 156 may take any of a number of forms or combinations thereof. For example, two such patterns 156a and 156b are shown in FIGS. 18 and 19, respectively. In alternative embodiments, mold M1 forms logos, designs, insignias, and other marks (not shown) in outer tactile layer 14. Mold M1 preferably includes a base plate B1 and a heated platen 150 formed with a cavity 152. Platen 150 is provided with depending protrusions 154 that engage outer surface 98 of panel P1 so as to form the depressed friction enhancing pattern 156, as seen in FIG. 17.

As noted above, in alternative embodiments, other patterns may be formed on outer tactile layer 40. These patterns may also incorporate stamped visual indicia, including designs or logos, on the grip panel P1. Stamped visual indicia is ink stamped onto outer layer 14 using a suitable ink known to those of skill in the art. Preferably, the ink is waterproof and heat resistant and, more preferably, formulated to resist degradation when coming into contact with the lubrication fluid or solvent used to apply the completed grip, for example G1, over the end of a golf club C shaft SC (FIG. 69) or the completed putter grip, for example PG2, over the end of a putter PC shaft SP (FIG. 70). It is to be understood that the figures herein presented are representative only and many other patterns and stamps may be used with this panel grip. See, for example, patterns presented in U.S. Pat. No. 6,843,732.

Referring now to FIGS. 20 and 21, there is shown yet another embodiment of the present invention. Coupled multilayered panel P4 is a modified version of panel P3 in which friction enhancing pattern 156a has been applied to outer multilayered panel 602a and friction enhancing pattern 156b has been applied to outer multilayered panel 602b. Many other combinations of patterns may be used in various other embodiments of the invention including incorporation of patterns on inserts such as those illustrated in panel P2.

Coupled multilayered panel P4 is coupled, for example, to putter underlisting sleeve PU to form grip PG4, as shown in FIG. 53 and described herein below. Panel P4 may also be coupled to underlisting sleeve U to form grip G4 (not shown).

Referring now to FIGS. 22 through 25, there is shown an underlisting sleeve U preferably formed of a resilient material such as a natural or synthetic rubber or plastic. Sleeve U includes an integral cap 1002 at its top end 1050, while the bottom end 1052 of sleeve U is formed with a nipple 1004. Sleeve U has a surface 1010 extending between the underside of cap 1002 and the top side of nipple 1004. The underside of cap 1002 is formed with a downwardly extending slot 1020 which wraps circumferentially around underlisting U. Slot 1020 is formed by a lip 1054 extending downwardly from cap 1002. Lip 1054 defines an inner surface 1028 facing surface 1010 of sleeve U, a lower surface 1022 facing downward from cap 1002, and an outer surface 1024 facing away from surface 1010 of sleeve U. Downwardly extending lip 1054 extends over a portion 1026 of surface 1010 of sleeve U. The upper most portion of slot 1020 is defined by an inner downwardly facing surface 1058. Preferably, lip 1054 is formed so as to resist flexing away from surface 1010 of underlisting sleeve U. Slot 1020 receives, for example, skived top region 78 of panel P1 as described hereinafter and illustrated in FIG. 59.

Similarly, nipple 1004 of underlisting U is formed with an upwardly extending slot 1030 defined by a portion 1036 of surface 1010 of sleeve U and lip 1056 extending upwardly from nipple 1004 and preferably wrapping circumferentially around sleeve U. Lip 1056 defines an inner surface 1038 facing sleeve U, an upper surface 1032 facing upward from nipple 1004, and an outer surface 1034 facing away from surface 1010 of sleeve U. Upwardly extending lip 1056 extends over portion 1036 of surface 1010 of sleeve U. The lower most portion of slot 1030 is defined by an inner upwardly facing surface 1060. Preferably, inner surface 1038 tapers toward outer surface 1034 as lip 1054 extends upward such that upper surface 1032 is smaller than downwardly facing surface 1058. One advantage to such an angled construction of nipple lip 1056 is that it allows lip 1056 to flex outwards from surface 1010 of sleeve U. Though lip 1056 may flex outward from sleeve U, it preferably resists remaining in a fully flexed position in which it lays flat, thereby fully exposing sleeve U surface 1036. In alternative embodiments, inner surface 1038 does not taper and upper surface 1032 and lower surface 1022 are generally equal in width. In still other embodiments, outer surface 1034 tapers toward inner surface 1038. Nipple slot 1030 receives, for example, skived bottom region 86 of panel P1, as described herein after and illustrated in FIG. 60. Preferably, underlisting sleeve U will be formed with centering notches 1006, 1008 indicating a middle point for application of the completed grip panel, for example P1, to underlisting sleeve U to form complete grip G1.

Referring now to FIGS. 26 through 35, panel P1 is shown being applied to underlisting sleeve U. In FIG. 26, exterior surface 1010 of underlisting sleeve U is shown receiving adhesive 34 by means of a nozzle 32, brush, or the like. In FIG. 27, inner surface 100 of panel P1 is shown receiving adhesive 34 by means of a nozzle 32, brush, or the like. In the alternative, only one or the other of the panel P1 and the sleeve U receive the adhesive 34.

FIG. 28 shows panel P1 being wrapped around and coupled to underlisting sleeve U. During this operation, notches 28, 30 of panel P1 are disposed in alignment under notches 1006, 1008 of underlisting sleeve U. Also, top region 78 of panel P1 will be manually inserted within slot 1020 of underlisting cap 1002, while bottom region 86 of panel P1 is manually inserted within slot 1030 formed within nipple 1004, preferably by temporarily flexing lip 1056 outwardly (see FIGS. 59 and 60).

As shown in FIGS. 31 through 35, first and second lateral extensions 58 and 60, respectively, of panel P1 will be coupled together to form a seam 170. Because of overlapping extensions 58, 60, seam 170 extending generally through panel P1 from surface 1010 of sleeve U to outer surface 98 of panel P1 does so in step-like increments. Such a construction results in a particularly strong interface, especially where the various strength layers are coupled together.

In a preferred embodiment, seam 170 includes three attachment interfaces 172, 174, and 176, as shown in FIG. 35. Inner attachment interface 172 is preferably formed between at least a portion of inner abutment surfaces 54 and 64. Intermediate attachment interface 174 is preferably formed between at least a portion of intermediate abutment surfaces 52 and 62. Outer attachment interface 176 is preferably formed between at least a portion of outer abutment surfaces 68 and 66. In a preferred embodiment, outer attachment interface 176 comprises outer attachment interface 176a defined by the intersection of outer attachment surface 66a and outer attachment surface 68a and outer attachment interface 176b defined by the intersection of outer attachment surface 66b and outer attachment surface 68b.

Though it is preferred that seam 170 include all three interfaces 172, 174, and 176, other embodiments may include a seam in which only portions of intermediate interface 174 and portions of outer interface 176 are used to secure the seam 170. Such a seam maintains its strength predominantly because it includes at least one interface in which portions of strength layers are joined.

A suitable adhesive 34 has the chemical formula polychloroprene ($C_4H_5Cl$) and Toluene ($CH_5CH_3$). As panel P1 is being wrapped about and coupled to underlisting sleeve U, sleeve U may be temporarily supported on a collapsible mandrel 1070 in a conventional manner.

In still another embodiment, adhesive 34 is sprayed on panel P1 such that it covers only inner strength panel 16, inner abutment surfaces 54 and 64, intermediate abutment surfaces 52 and 62, and portions 66b, 68b of outer abutment surfaces 66 and 68. The top and bottom regions 94 and 96, or skived top and bottom regions 78 and 86, could also include adhesive. After panel P1 is wrapped around underlisting sleeve U, hot polyurethane 168 may be injected between portions 66a, 68a of outer abutment surfaces 66 and 68 by a needle, brush, sprayer, or the like. After polyurethane 168 hardens, it may be buffed by a suitable brush or the like to smoothly blend into the surface of the grip G1 any polyurethane spilling from seam 170. Alternatively, excess polyurethane 168 is not buffed or removed from the surface of the grip G1.

In one embodiment, seam 170 is left alone and the completed grip G1 is finished, as shown in FIG. 30. As shown in FIGS. 36 through 39, in an alternative embodiment a second mold M2 is used to heat bond portions 66a, 68a along outer attachment interface 176a. Mold M2 preferably includes a heated platen 158 which is urged against the outer surface of the seam 170. Base B2 supports grip G1 within mold M2. Heated platen 158 heats side regions 8 and 10 of outer tactile layer 14 to heat bond them together along outer attachment interface 176a of seam 170, forming seam 170'. Grip G1 modified with mold M2 is shown as grip G1' in FIG. 40.

Referring now to FIGS. 43 through 50, there is shown a panel putter grip PG for use with a conventional putter club PC. Grip PG1 (FIG. 48) includes a resilient underlisting sleeve UP (FIGS. 43 through 47) which is generally similar to the above described underlisting U, except that underlisting sleeve UP is not of an annular configuration. Instead, the front surface 1080 of the underlisting sleeve UP is of a generally flat configuration in accordance with the design of most putters in general use. It should be understood that putter underlisting sleeve UP receives a panel in a similar fashion as above described underlisting sleeve U.

In a preferred embodiment, grip PG1 (FIG. 48) is smooth. PG1 may also include visual indicia (not shown) that may be ink stamped as described above. Because a putter is generally subjected to less forces due to the shortened putting swing as compared to the generally longer swing associated with other clubs, putter grip PG1 generally does not require a friction enhancing pattern 156. However, it is contemplated that such a pattern can be incorporated into a putter grip PG4 as herein described above and shown in FIG. 53.

As will be appreciated by those of skill in the art, a number of different modifications may be made to the above described embodiments that are captured within the scope of the present disclosure. Referring now to FIGS. 58 through 62, there is shown the steps for the modification of the combination of panel P1 and underlisting sleeve U into one such additional embodiment G5. FIG. 54 shows the grip G5 prior to modification held on mandrel 1070 and inside a third mold M3. Mold M3 includes a longitudinally extending heated pressure tooth 1100 and a base B3. Longitudinally extending heated pressure tooth 1100 (FIG. 55) is urged against grip G5 at seam 170 and along outer surface 98 of panel P1. Such heated tooth 1100 forms a small depression 1102 in outer multilayered panel 2 along at least a portion of the length of outer attachment interface 176 so as to further strengthen such seam 170. The first embodiment of completed grip G5 is shown in FIGS. 58 through 60.

Referring to FIGS. 59 and 60, it will be seen that a portion of top skived region 78 of panel P1 is securely disposed within cap slot 1020 and a portion of bottom skived region 86 of panel P1 is securely disposed within nipple slot 1030. Preferably, top region 78 is manually inserted into cap slot 1020 without the need for flexing outward cap lip 1054. Nipple lip 1056 is preferably flexed outward from the surface 1010 of sleeve U to facilitate the insertion of bottom region 86 within nipple slot 1030. Lips 1054 and 1056 cooperate with the remainder of sleeve U to securely retain panel P1. Lips 1054 and 1056 also cooperate with seam 170, and in other embodiments with seams extending into the top and bottom peripheries of the panel, to maintain the integrity of the grip during use or ingress and egress from storage compartments such as golf bags and the like. Completed grip G5 is then removed from mandrel 1070 and is ready to be slipped onto and adhered to shaft SC of golf club C in a conventional manner.

FIGS. 61 through 64 show a golf club grip G5' similar in all respects to grip G5 with the exception that at least a portion of depression 1102 is filled with hot polyurethane 168 by a nozzle 1104, needle, pen, brush, or the like (FIG. 61). After polyurethane 168 hardens, some or all of it can be buffed by a suitable brush 1106 or the like to smoothly blend into surface 98 of grip G5' as shown in FIG. 62. Alternatively, polyurethane 168 is not buffed.

Figure 66:
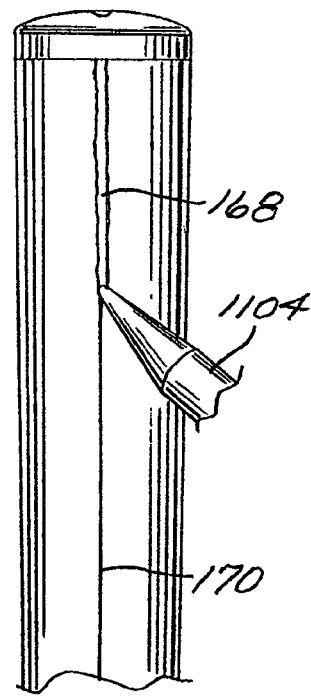
FIG. 66 is a broken rear view showing a first step in making a modification to the grip shown in FIG. 65.
Figure 67:
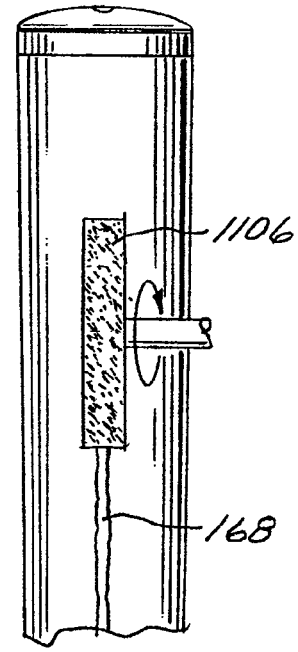
FIG. 67 is a broken rear view showing a second step in making a modification to the grip shown in FIG. 65.
Figure 68:
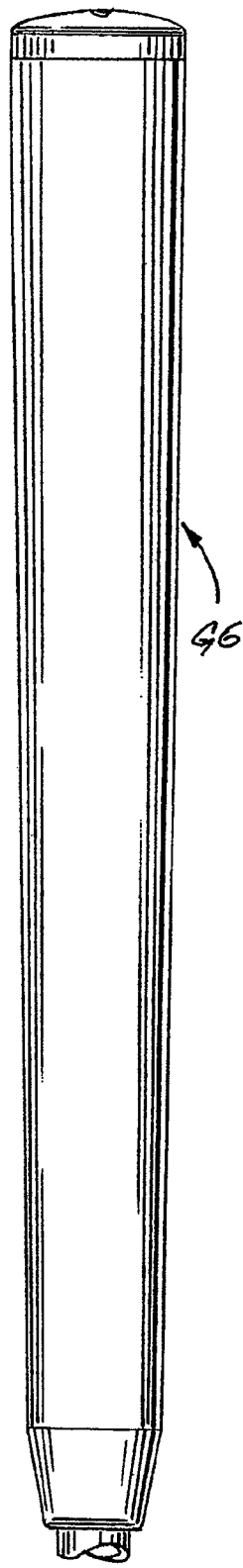
FIG. 68 is a rear view of a panel member coupled to an underlisting sleeve after the modification steps shown in FIGS. 66 and 67, according to one embodiment.

Referring now to FIGS. 65 through 68, there is shown another modification of embodiment G1 into yet another embodiment G6. In this modification, depressed reinforcement channel 1102 is not utilized. Instead, after seam 170 has been formed, a small quantity of hot polyurethane 168 is coated over and along at least a portion of seam 170 by a nozzle 1104, needle, pen, brush, or the like, as shown in FIG. 66. After polyurethane 168 hardens, some or all of it may be buffed by a suitable brush 1106 or the like to smoothly blend into surface 98 of grip G6, as indicated in FIGS. 67 and 68. Alternatively, polyurethane 168 is not buffed.

Though the above embodiment using mold M3 is illustrated using panel P1 and underlisting U, the teachings could likewise be applied to other embodiments, such as those for use with putter clubs PC, as with putter grip PG1. In addition, heated tooth 1100 of mold M3 may be shaped to correspond, in whole or in part, to various internal insert and other internal seams as described herein above with respect to various other embodiments. Likewise, the internal seams may also be covered, in whole or in part, by liquid polyurethane in conjunction with or without a channel. In some embodiments, at least a portion of the polyurethane is buffed to present a smooth surface with the rest of the surface of the grip, while in some embodiments it is not.

It should be understood that the outer surface of a grip embodying the present invention may also be coated, in whole or in part, by means of a brush, nozzle, spray, or the like with a thin layer of polyurethane (not shown) to protect such surface, add tackiness thereto, and increase the durability thereof.

A golf club grip of the present invention provides the advantages over the existing wrapped and single panel grips described hereinbefore. Additionally, such grip has the appearance of a molded, one-piece grip familiar to professional and low-handicap golfers. Although some of such golfers are reluctant to use a non-traditional wrapped club grip, they are willing to play with a structurally integral grip of the present invention since such grip affords the shock absorbing and tackiness qualities of a wrapped grip. Further, many individual golfers and high school, college, and professional teams like the camaraderie and unification that can be achieved by putting team colors on their golf grips without sacrificing comfort, durability, or tackiness because of paint embossment. My present invention allows the application of the multiple colors to golf club and putter grips to allow these teams and individuals to express their spirit and enthusiasm in a way never before possible.

It will be understood that the foregoing is only illustrative of the principles of the invention, and that various modifications, alterations, and combinations can be made by those skilled in the art without departing from the scope and spirit of the invention.

What is claimed is:

1. A grip configured to be gripped by the hand of a user and slipped onto a handle portion of an article, the grip comprising:
    an outer tactile layer;
    an inner strength layer;
    the outer tactile layer coupled to the inner strength layer and shaped into a multilayered panel, the multilayered panel having a top end, a bottom end, two sides extending between the ends, an inner surface, and an outer surface, wherein the multilayered panel comprises at least one insert and at least one internal seam extending between the inner and outer surfaces of the multilayered panel;
    an inner strength panel having a top end, a bottom end, and two sides extending between the ends, said inner strength panel comprising a textile; and
    a resilient underlisting sleeve, wherein the multilayered panel is coupled to the inner strength panel to form a panel assembly, the panel assembly wrapped about and adhered to the resilient underlisting sleeve such that the outer tactile layer is disposed further from the sleeve than is the inner strength panel and the combination panel assembly and sleeve are configured to be slipped onto the handle portion of the article and wherein the at least one insert is wholly enclosed within an outer surface of the panel assembly and the grip further comprises a second insert which forms an outer peripheral extremity of the panel assembly.

2. The grip of claim 1, further comprising a friction enhancing pattern.

3. The grip of claim 1, wherein the at least one insert further comprises a friction enhancing pattern.

4. The grip of claim 1, wherein the at least one insert of the multilayered panel comprises a different color than the multilayered panel which is not the insert.

5. The grip of claim 1, wherein the at least one insert is shaped as a modified oval.

6. The grip of claim 5, wherein the at least one insert defines a surface area of at least 3 square inches on an outer surface of the panel assembly.

7. The grip of claim 5, wherein the at least one insert is the same thickness as the multilayered panel.

8. The grip of claim 1, wherein the at least one insert is the same thickness as the multilayered panel.

9. The grip of claim 1, wherein the at least one insert and the second insert are the same thickness as the multilayered panel.

* * * * *